(12) United States Patent
Ubl et al.

(10) Patent No.: US 7,021,097 B1
(45) Date of Patent: Apr. 4, 2006

(54) METHOD FOR ADJUSTING A HEAD SUSPENSION PARAMETER

(75) Inventors: Timothy Raymond Ubl, Darwin, MN (US); Senthil Balasubramaniam, Chaska, MN (US); Hryhory T. Koba, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 10/989,977

(22) Filed: Nov. 16, 2004

Related U.S. Application Data

(62) Division of application No. 09/500,592, filed on Feb. 10, 2000, now Pat. No. 6,837,092.

(51) Int. Cl.
*B21C 51/00* (2006.01)

(52) U.S. Cl. .............................. 72/31.1; 72/17.3; 72/37; 72/342.94; 29/603.09

(58) Field of Classification Search ................. 72/16.3, 72/17.3, 19.4, 31.1, 342.1, 342.94, 37; 29/603.09, 29/603.1; 11/603.12; 360/244.3, 244.8, 360/245, 245.3, 245.4, 245.6; 356/3.03, 356/3.06, 3.07, 152.2
See application file for complete search history.

(56) References Cited

U.S. PATENT DOCUMENTS 5,588,200 A * 12/1996 Schudel ................... 29/603.01
5,636,013 A * 6/1997 Swift ......................... 356/3.03
5,832,764 A * 11/1998 Girard ......................... 72/16.3
5,929,987 A * 7/1999 Hayes ......................... 356/337
5,956,212 A * 9/1999 Zhu ......................... 360/245.4
6,011,239 A * 1/2000 Singh et al. ............. 219/121.6
6,057,975 A * 5/2000 Yaeger et al. ................. 360/75
6,154,952 A * 12/2000 Tangren ................... 29/603.04
6,711,929 B1 * 3/2004 Yamaguchi et al. ....... 72/342.1

* cited by examiner

*Primary Examiner*—Ed Tolan
(74) *Attorney, Agent, or Firm*—Faegre & Benson LLP

(57) ABSTRACT

A method for adjusting the static attitude of a head suspension by scanning a region of the head suspension with a laser. A head suspension having a gimbal region is provided that permits a head slider attached thereto to gimbal about pitch and roll axes in response to fluctuations in an air bearing over which the head slider flies. One or more predetermined regions of the head suspension are irradiated by a laser beam by scanning the laser beam across the head suspension regions to affect the static attitude of the head suspension. In a preferred embodiment, a plurality of parallel spaced apart lines are scanned on the leaf spring arms of a flexure with the laser to correct pitch errors in static attitude, and a plurality of parallel spaced apart lines are scanned with the laser in the cross section attached to the leaf spring arms to correct roll errors in static attitude. One or both sides of the head suspension can be scanned to create a desired pitch and/or roll correction. In addition, the predetermined scan regions can be scanned with a second plurality of lines to provide a precise static attitude adjustment.

17 Claims, 16 Drawing Sheets

METHOD FOR ADJUSTING A HEAD SUSPENSION PARAMETER

CROSS-REFERENCE TO RELATED APPLICATION

This application is a divisional of application Ser. No. 09/500,592, filed Feb. 10, 2000 now U.S. Pat. No. 6,837,092, entitled METHOD FOR ADJUSTING A HEAD SUSPENSION PARAMETER, the entire contents of which are hereby incorporated by reference.

TECHNICAL FIELD

The present invention relates generally to a method for adjusting a parameter of a head suspension through the application of heat to the head suspension. In particular, the present invention is a method for adjusting the static attitude of a head suspension by scanning with a laser beam a plurality of lines in a desired region of the head suspension.

BACKGROUND OF THE INVENTION

Head suspensions are well known and commonly used within dynamic magnetic or optical information storage devices or drives with rigid disks. The head suspension is a component within the disk drive that positions a magnetic or optical read/write head over a desired position on the storage media where information is to be retrieved (read) or transferred (written). Head suspensions for use in rigid disk drives typically include a load beam that generates a spring force and that supports a flexure to which a head slider having a read/write head is to be mounted. The load beam includes a mounting region at a proximal end, a rigid region at a distal end, and a spring region between the rigid region and the mounting region for providing the spring force. Head suspensions are normally combined with an actuator arm or E-block to which the mounting region of the load beam is mounted with a base plate so as to position (by linear or rotary movement) the head suspension, and thus the head slider and read/write head, with respect to data tracks of the rigid disk.

The rigid disk within a disk drive rapidly spins about an axis, and the head slider is aerodynamically designed to "fly" on an air bearing generated by the spinning disk. The spring force (often referred to as the "gram load") generated by the load beam urges the head slider in a direction opposing the force generated by the air bearing. The point at which these two forces are balanced during operation is the "fly height" of the head slider.

The flexure typically includes a slider bond pad to which a head slider is attached. The flexure attached to the load beam provides a resilient connection between the slider and the load beam, and permits pitch and roll motion of the head slider and read/write head as they move over the data tracks of the disk in response to fluctuations in the air bearing caused by fluctuations in the surface of the rigid disk. Head suspension flexures can be provided in numerous ways, including designs in which the load beam and flexure are formed integrally with one another (a two-piece design comprising the base plate and the integral load beam/flexure) and designs in which the flexure is a separate piece from the load beam (a three-piece design comprising the base plate, the load beam and the separate flexure). One three-piece design includes a flexure having a resilient tongue and two resilient spring arms. The head slider is supported on the resilient tongue (i.e. the slider bond pad), which is in turn supported between the spring arms. The spring arms are connected to a flexure mounting region, which is in turn connected to the load beam. The gram load provided by the spring region of the load beam is transferred to the flexure via a dimple that extends between the rigid region of the load beam and the flexure. The spring arms allow the tongue of the flexure to gimbal in pitch and roll directions to accommodate surface variations in the spinning magnetic disk over which the slider is flying. The roll axis about which the head slider gimbals is a central longitudinal axis of the head suspension. The pitch axis about which the head slider gimbals is perpendicular to the roll axis. That is, the pitch axis is transverse to the longitudinal axis of the load beam, and crosses the roll axis at or around the head slider.

In order to store and retrieve data from magnetic or optical disks on which data is densely packed, it is necessary for the head slider to fly closely above the surface of the spinning data disk (on the order of 0.1 µm) without colliding with the disk ("crashing"). Further, because of the dense packing of data on magnetic or optical disks, it is important for the read/write head attached to the head slider to be able to read from or write to a relatively small area or spot on the disk.

In relation to this, important performance characteristics of a head suspension include the fly height at which the head suspension positions a head slider and the positional orientation of the head slider in relation to the spinning data disk when the head suspension is in a "loaded" state (i.e. under the influence of the balanced forces created by the spring force and the air bearing). The head slider is designed to fly at a predetermined orientation, typically with its bottom surface or a portion thereof arranged generally parallel with the surface of the disk, and this orientation is often referred to as the "dynamic attitude".

When the head suspension is not actually flying over a spinning disk, the loaded state of the head suspension can be simulated by applying a force in the same direction as the air bearing force at a point on the head suspension other than to the slider bond pad where the head slider would be attached (or, if the slider is attached, other than to the head slider). This force is applied to lift the slider bond pad to its loaded position at the fly height. The orientation or attitude of the slider bond pad under this simulated loaded state is referred to as "static attitude." The difference or bias between the dynamic attitude and the static attitude can be measured for a given head suspension so that a measurement of the static attitude, which can be an easier measurement to make than dynamic attitude, can be used to determine dynamic attitude for a given head suspension. In other words, a head suspension typically has a predetermined static attitude that can be used to assess the dynamic attitude of a head slider attached to the head suspension during normal operation of a disk drive.

Static attitude of a head slider bond pad can be measured with reference to pitch and roll axes of the head suspension. Roll is a rotation of the slider bond pad about the roll axis of the head suspension and pitch is a rotation of the slider bond pad about the pitch axis of the head suspension. Deviations from the desired static attitude about the roll axis can be referred to as roll errors, while deviations from the desired head slider attitude about the pitch axis can be referred to as pitch errors. Pitch and roll errors in static attitude can be caused by manufacturing variations of the head suspension, handling of the head suspension and related components during and after manufacturing, or contamination of the head suspension by airborne foreign matter.

If pitch and/or roll errors exist in the static attitude of a head suspension, there is a greater possibility that errors will exist in the dynamic attitude of the head slider, and that the head slider might crash into the disk. Such crashes are generally undesirable. Further, errors in static attitude of the head slider can cause the read/write head to be out of proper orientation to the surface of the disk or further from the disk surface than it is designed to be. As such, the read/write head may not be able to "focus" on as small an area or spot on the disk as is necessary to efficiently transfer data to or from the disk. This can degrade disk drive performance.

In addition, it may be desirable to adjust the static attitude of a head suspension from a nominal orientation to impart a desired pitch and/or roll bias into the head suspension. In so far as these biases represent incremental changes in pitch and roll static attitude imparted to the head suspension, these too can be viewed as pitch and roll corrections, and the differences between nominal and desired attitude can again be referred to as pitch and roll errors.

Because of the importance of correct head slider attitude, various methods exist for correcting pitch and roll errors to obtain appropriate static attitude. Such methods are disclosed in, for example, U.S. Pat. No. 5,682,780, issued Nov. 4, 1997 to Girard for "Gram Load, Static Attitude And Radius Geometry Adjusting System For Magnetic Head Suspensions"; U.S. Pat. No. 5,608,590, issued Mar. 4, 1997 for "Gimballing Flexure With Static Compensation And Load Point Integral Etched Features"; and U.S. Pat. No. 5,729,889 issued Mar. 24, 1998 for "Method Of Mounting a Head Slider To a Head Suspension With Static Offset Compensation". Each of these applications and patents are commonly owned by the assignee of the present application and are fully incorporated herein by reference for all purposes.

One method of correcting errors in the static attitude involves mechanically twisting and/or bending the head suspension to alter the profile of the load beam. In such a method, the profile of the load beam can be altered to support the flexure at an attitude to the disk surface that compensates for any errors in the static attitude of the head suspension. That is, the load beam can be bent about an axis perpendicular to the longitudinal axis of the load beam to account for pitch errors in the static attitude of the head suspension. The load beam can also be twisted about its longitudinal axis to account for roll errors in the static attitude. Similarly, the flexure can be mechanically bent and twisted to try to correct static attitude errors.

Adjusting the head suspension in this way, however, can negatively affect other head suspension parameters, such as the fly height, gram load, and overall resonance profile of the head suspension. In particular, bending the head suspension to affect pitch static attitude also affects gram load, resonance, and head lift height, while twisting the head suspension to correct roll static attitude affects head suspension resonance and introduces vibratory motion in the off-track direction, which can negatively impact disk drive performance. Such mechanical adjustments can also be undesirable due to the amount of forming required to get an appropriate adjustment in static attitude. Moreover, it can be difficult to properly mechanically deform head suspension components due to their relatively small size, which limits the size and operating room for tools used to perform the mechanical adjustments.

Further, it is known to form electrical leads on the load beam for carrying electronic read/write signals from the read/write head to data electronics. It can be difficult to mechanically alter the profile of the head suspension without adversely affecting the electrical leads. Electrical leads can also make it difficult to engage tooling with the suspension components to make a static attitude adjustment.

Mechanically adjusting head suspension static attitude can also be inefficient in terms of the precision with which static attitude can be corrected, and in the cycle time it takes to correct the static attitude of an individual head suspension. It is a general industry trend to more densely pack information onto a magnetic disk so as to be able to make disk drives smaller without impacting the amount of data that can be stored in the drive. This necessitates smaller disk drive components, including smaller head suspensions. As data density increases and head suspension size decreases, it becomes increasingly important that the head slider be at the desired attitude when at the fly height, and acceptable tolerances on head suspension static attitude are reduced. Current methods for correcting deviations in static attitude thus may not provide sufficiently fine corrections to account for decreased static attitude tolerances. This can be particularly true when the static attitude correction occurs in individual components of the head suspension prior to mounting them together, since additional errors may be introduced in the mounting process.

Moreover, the conventional static attitude adjustment methods described above are typically performed along with head suspension load beam adjustments to gram load, and mixing the two adjustment processes can create longer feedback loops in the manufacturing process, which increases part cycle time. Mixing the two adjustment processes can also lead to less accurate static attitude adjustments, which negatively impacts part yield.

There is a continuing need to develop more efficient methods for correcting pitch and/or roll errors in head suspension static attitude. A method that provides precise error corrections in a timely fashion, and that can be achieved without significant impact on other performance criteria of the head suspension is highly desirable.

SUMMARY OF THE INVENTION

The present invention is intended to overcome the shortcomings of conventional methods for adjusting performance characteristics of a head suspension, such as the static attitude of the head suspension. In this regard, the present invention provides a precision "micro-warping" technique for adjusting a head suspension parameter, such as pitch and roll static attitude. The micro-warping technique can provide sufficiently precise corrections to meet increasingly tight performance requirements on static attitude. The present invention can also be performed at relatively fast cycle times, and can provide corrections that have limited impact on other performance parameters of the head suspension.

The present invention is a method for adjusting a performance parameter of a head suspension, comprising the step of scanning a predetermined region of the head suspension with a laser beam. Scanning the predetermined region of the head suspension with the laser beam imparts heat to the region in a controlled manner, and thus adjusts the performance parameter of the head suspension. In a preferred embodiment, the static attitude of the head suspension is adjusted through the scanning of a first scan region located on the head suspension. The scan region can be located on a first spring arm of a head suspension flexure, and a second scan region can be located on a second spring arm of the flexure. A plurality of lines can be scanned in the first and second scan regions, with the lines being adjacent to each other and parallel to the transverse axis of the head suspension. In such an embodiment, the lines extend across the entire width of the first and second spring arms, and each line causes a discrete amount of micro-warping in the scan region to introduce a pitch bias to the static attitude. The first and second scan regions can be located on a top surface of the flexure, on a bottom surface of the flexure, or on a combination of one scan region on the top surface and the other scan region on the bottom surface.

In a second embodiment, a first scan region can be located on a cross piece of a head suspension flexure. The first scan region is spaced apart from the longitudinal axis of the head suspension in a first direction, and a second scan region can be located on the cross piece of the flexure spaced apart from the longitudinal axis in a second direction opposite from the first direction. A plurality of lines can be scanned in each of the first and second scan regions, with the plurality of lines being spaced apart from each other and parallel to the longitudinal axis of the head suspension. The plurality of lines will cause the cross piece to warp in the scan region, which will twist the flexure and cause a roll bias in the static attitude of the head suspension. In such an embodiment scan regions can also be located on the spring arms of the flexure, with a plurality of lines scanned in the spring arm scan regions to effect a pitch bias in the static attitude.

Another embodiment of the present invention includes an iterative, closed loop process for providing precise adjustments to the static attitude of a head suspension. In such an embodiment, a coarse static attitude adjustment is performed by scanning a scan region of the head suspension with a laser beam. The static attitude provided by the head suspension after the coarse static attitude adjustment is performed is then measured and a fine static attitude adjustment is performed by scanning the scan region a second time with the laser beam. In a preferred embodiment, the step of performing the coarse static attitude adjustment includes determining pitch and roll errors between the desired static attitude and the measured static attitude of the head suspension, and determining the amount of scanning necessary to correct at least a portion of one of the pitch error and the roll error. The amount of scanning can be controlled by controlling the number of scan lines that are scanned in the head suspension. The amount of scanning, e.g. the number of scan lines, necessary to correct at least a portion of the other of the pitch error and the roll error can also be determined. Determining the number of scan lines necessary to correct the portion of the pitch and roll errors can be accomplished by referencing stored coarse adjustment data describing the relationship between angular deflection and the number of lines scanned in a head suspension region. In one embodiment, the portion of the pitch error and the roll error that are corrected by the coarse static attitude adjustment is greater than about eighty percent of the total pitch error and greater than about eighty percent of the total roll error between the desired static attitude and the measured static attitude.

The fine static attitude adjustment can be performed in a similar fashion, wherein the remaining pitch error and roll error between the desired static attitude and the static attitude provided by the head suspension after the coarse static attitude adjustment are first determined, and the amount of scanning necessary to compensate for one of the remaining pitch error and the remaining roll error is predicted. The prediction can be made by consulting stored fine adjustment data describing the relationship between the angular deflection and the number of scan lines scanned in the scan region of the head suspension. In one embodiment of this invention, a response factor is calculated after the coarse static attitude adjustment. The response factor comprises a ratio between the estimated angular deflection for the coarse static attitude adjustment and the measured static attitude adjustment. The number of scan lines for the fine static attitude adjustment can be upwardly or downwardly adjusted based upon the response factor.

BRIEF DESCRIPTION OF THE DRAWINGS

FIG. 6b is a block diagram flow chart illustrating an additional step in the closed loop, iterative process of FIG. 6a.

DETAILED DESCRIPTION OF THE INVENTION

Figure 1:
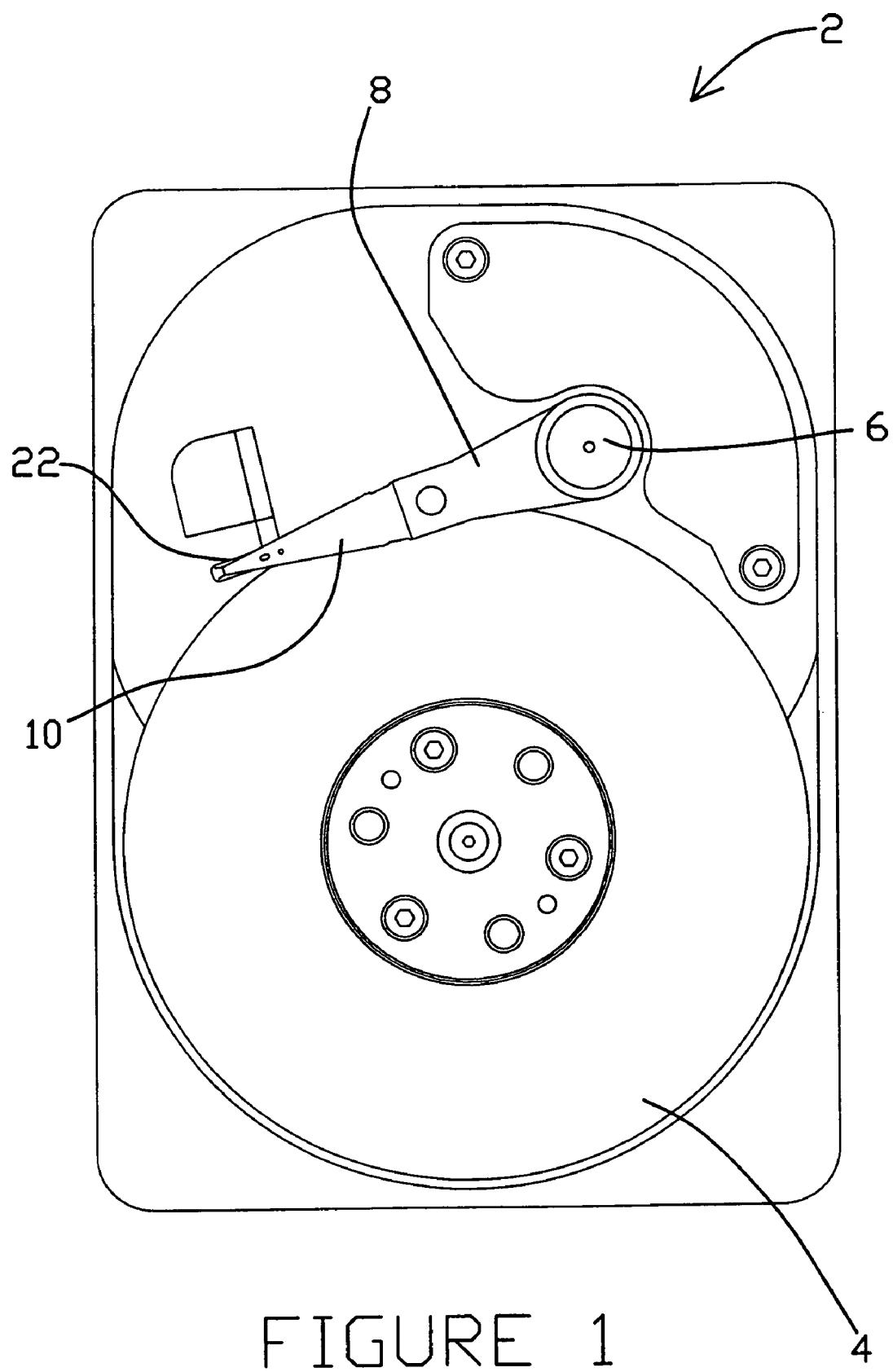
FIG. 1 is a top planar view of a disk drive having a head suspension assembly positioned over a magnetic disk.

With reference now to the Figures, a disk drive 2 having a head suspension 10 suspended over a disk 4 is shown in FIG. 1. Head suspension 10 supports a head slider 22 at its distal end over the disk 4. Head suspension 10 is attached at its proximal end to an actuator arm 8, which is coupled to an actuator motor 6 mounted within disk drive 2. Actuator motor 6 is used to position the actuator arm 8, head suspension 10, and slider 22 over a desired position on the disk 4. In the embodiment shown, actuator motor 6 is rotary in nature, and operates to radially position the head suspension 10 and slider 22 over disk 4. Other actuator motors, such as a linear actuator motor, can of course be used.

In use, head slider 22 reads and/or writes data to and from disk 4 in disk drive 2, and the head suspension 10 supports and aligns the head slider 22 over a desired location on disk 4 in response to signals received from a microprocessor (not shown). Disk 4 rapidly spins about an axis, and an air bearing is created by rotating disk 4. Head slider 22 is aerodynamically designed to "fly" on the air bearing between the surface of the disk 4 and the head slider 22. As head slider 22 flies over the air bearing, it is urged away from the surface of the disk 4 by the air bearing. Head suspension 10 provides a gram load spring force that counteracts the force of the air bearing and urges the head slider 22 toward the surface of the disk 4. The point at which these two forces are balanced during operation is known as the "fly height" of the head slider. The specific positional orientation of head slider 22 provided by head suspension 10 at the fly height in relation to the surface of the disk 4 is commonly referred to as the "dynamic attitude" of the head slider 22.

Figure 2:
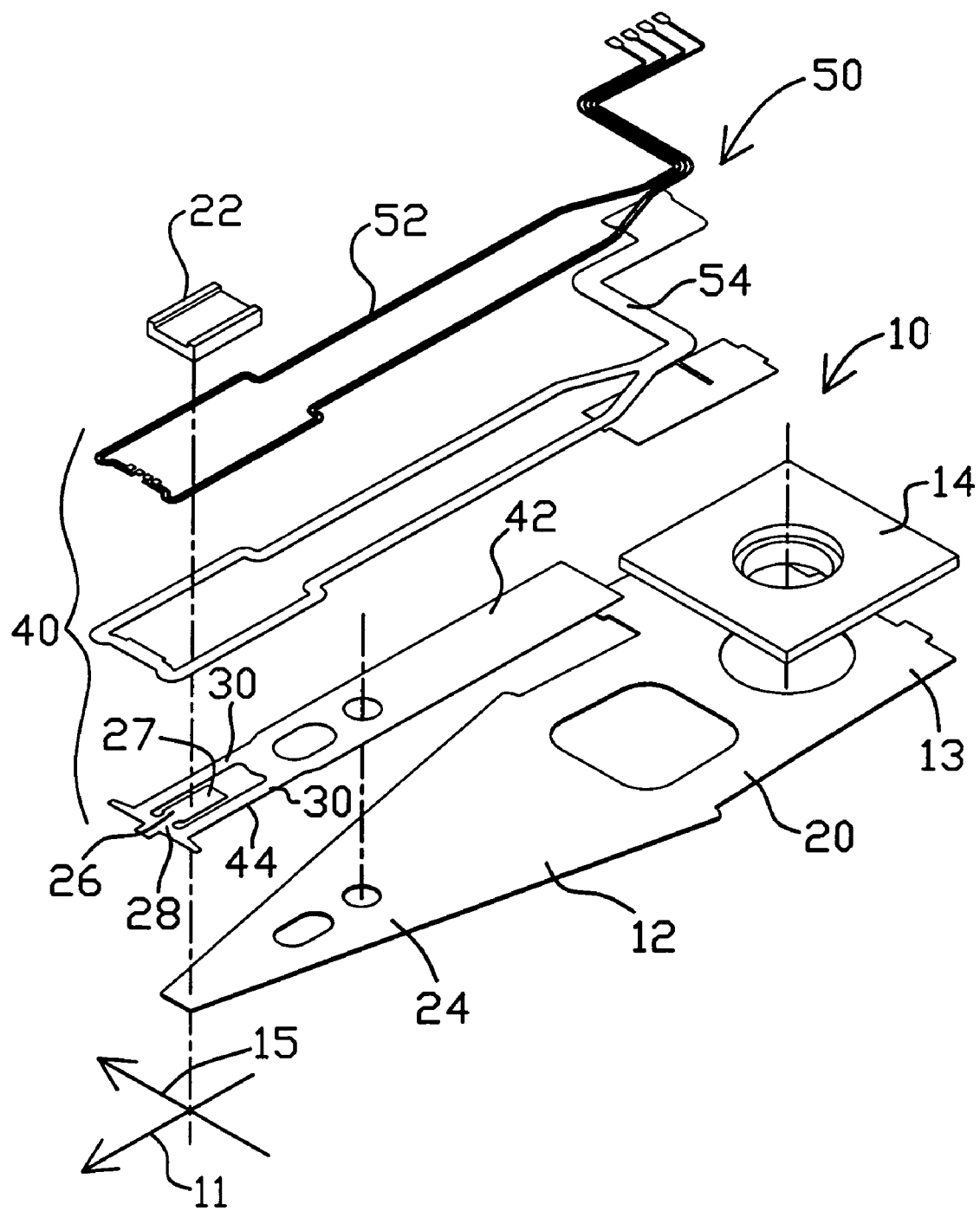
FIG. 2 is an exploded view of the head suspension assembly of FIG. 1.

As shown in greater detail in FIG. 2, head suspension 10 is comprised of a plurality of separate components that are mounted together. Head suspension 10 includes a load beam 12 to which a flexure 40 is mounted. Load beam 12 includes a mounting region 13 at the proximal end of the load beam 12, to which a base plate 14 is mounted. Mounting region 13 and base plate 14 are mounted to the actuator arm 8 of disk drive 2 in a known manner. Load beam 12 further includes a rigid region 24 at the distal portion of the load beam 12, and a spring region 20 located proximal of the rigid region 24 and distal of the mounting region 13. Flexure 40 (discussed more fully below) is mounted to the rigid region 24 of load beam 12, and provides a resilient connection between the load beam 12 and head slider 22.

Spring region 20 of load beam 12 provides a desired gram load that opposes the force exerted upon head slider 22 by the air bearing generated by rotating disk 4. Toward this end, spring region 20 can include a preformed bend or radius that provides a precise gram load force. The gram load is transmitted to flexure 40 through rigid region 24 of load beam 12. A load point dimple 9 (shown in FIG. 3) that extends between the rigid region 24 and the flexure 40 can be used to provide a point of transfer for the gram load generated by spring region 20. The load point dimple 9 also provides a point about which the head slider 22 attached to flexure 40 can gimbal in response to fluctuations in the air bearing.

Flexure 40 provides a resilient connection between head slider 22 and load beam 12, and is designed to permit head slider 22 to gimbal in response to variations in the air bearing generated by rotating disk 4. That is, minute variations in the surface of disk 4 will create fluctuations in the air bearing generated by the rotating disk 4. These fluctuations in the air bearing will cause slider 22 to roll about a longitudinal axis 11 of head suspension 10, and to pitch about a transverse axis 15. Longitudinal axis 11 is defined to extend along the center line of head suspension 10 and through the load point 9, while transverse axis 15 is defined to be orthogonal to axis 11 and intersect axis 11 at the load point between load beam 12 and flexure 40. Flexure 40 is designed to permit the slider 22 to gimbal in both pitch and roll directions in response to these air bearing variations. In the embodiment shown, flexure 40 is separately formed from load beam 12 (i.e. head suspension 10 is a three-piece design comprising base plate 14, load beam 12, and flexure 40), and includes a mounting region 42 that overlaps and is mounted to the rigid region 24 of load beam 12 using spot welds or other known techniques. Flexure 40 also includes a gimbal region 44 that can extend beyond the distal end of load beam 12, and that provides the resilient compliances that permit slider 22 to gimbal in pitch and roll directions. The gimbal region 44 is comprised of a pair of longitudinally extending spring arms 30 that are connected at the distal end of the arms 30 by a cross piece 28. The longitudinally extending spring arms 30 and cross piece 28 define a gap between the spring arms into which a tongue or cantilever beam 26 proximally extends from cross piece 28. Cantilever beam 26 includes a slider mounting surface 27 to which slider 22 is mounted using known methods such as adhesive. The cantilever beam 26 and spring arms 30 are sufficiently resilient to pitch about axis 15 and to torsionally rotate about axis 11 to permit pitch and roll motion of slider 22 as needed during operation of disk drive 2.

In the embodiment shown, flexure 40 also includes a trace assembly 50 (shown in exploded view in FIG. 2) that provides electrical interconnection between slider 22 and a microprocessor (not shown) of disk drive 2 to convey read and write signals to and from head slider 22. The trace assembly 50 of the shown embodiment is comprised of a conductive layer of material 52 formed into longitudinal traces that extend along the length of flexure 40, and an insulating layer of material 54 interposed between flexure 40 and the conductive layer 52. As is described in commonly assigned U.S. Pat. No. 5,844,751, the entire disclosure of which is hereby incorporated by reference for all purposes, the flexure 40 and trace assembly 50 can be formed integrally with each other from a multi-layer laminate sheet of material through the use of plasma etching and other known methods. A trace assembly can alternatively be formed separately from a flexure and mounted to the flexure in a known method, such as through the use of adhesive. The insulating layer of material of a trace assembly can also be deposited onto the flexure in a desired pattern, with the conductive layer of material of the trace assembly being deposited onto the insulating layer of material. Trace assembly 50 can be routed across the flexure in an number of desired patterns as dictated by a specific application. In the embodiment shown in FIG. 2, the trace assembly 50 at gimbal region 44 of flexure 40 is adjacent and spaced apart from the spring arms 30 of the flexure 40.

As described above in the Background section, during normal operation of disk drive 2, head slider 22 assumes an orientation over the surface of rotating disk 4 (the dynamic attitude) at a specific separation from the surface of the disk 4 (the fly height). As technology progresses, data tracks on disk 4 are being more closely spaced together on the surface of the disk to increase its storage capacity. In order to accurately write information to these data tracks and read information from these data tracks, it is necessary for head slider 22 fly closely above the surface of the spinning disk 4, and fly heights on the order of 0.1 micrometers are common. Given this close spacing between slider 22 and disk 4, and further in view of the dense packaging of data on the disk 4, it is also important that head slider 22 be properly aligned above disk 4 when at the fly height in order to read data from or write data to a relatively small area or spot on disk 4.

In this regard, one important performance criteria of a head suspension 10 is that it position head slider 22 at the desired orientation during normal operation of disk drive 2. In a typical operation, it is desired that the head slider 22 have a dynamic attitude that is generally parallel to the surface of disk 4 when the head slider is at the fly height, although other orientations that incline the head slider relative to a planar surface of disk 4 are contemplated. As described above in the Background section, the dynamic attitude of head slider 22 can be determined in terms of the static attitude of the head suspension 10. The static attitude of head slider 10 can be measured with reference to pitch axis 15 and roll axis 11 of head suspension 10, and any differences between a desired static attitude and the actual static attitude of head suspension 10 (whether those differences deviations from a nominal orientation or are desired pitch and roll biases to be introduced into the head suspension static attitude) can be characterized in terms of pitch errors and roll errors. Deviations from the desired static attitude measured about the transverse axis 15 of head suspension 10 are referred to as pitch errors, while deviations from the desired static attitude measured about longitudinal axis 11 are referred to as roll errors.

Figure 23:
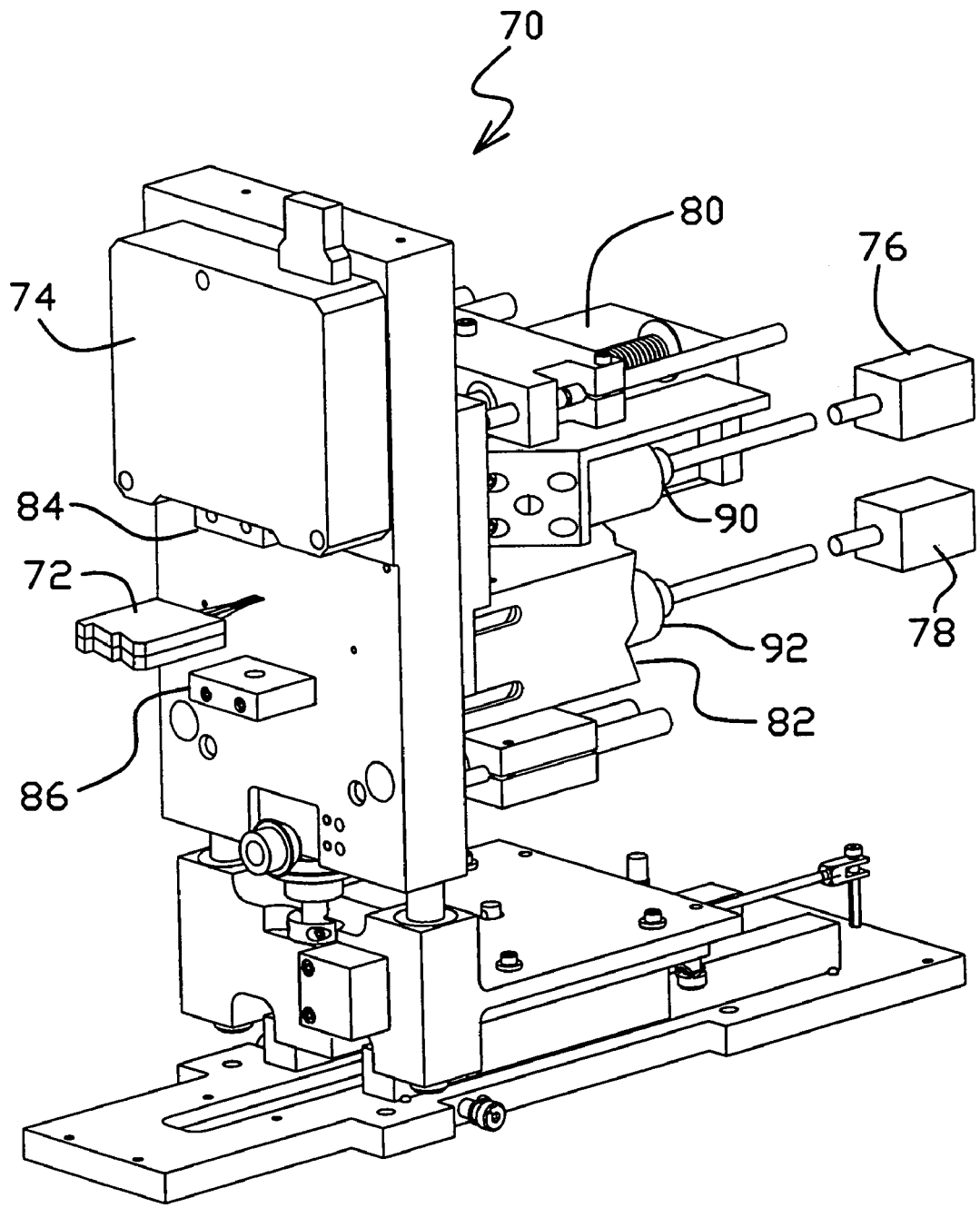
FIG. 23 is an isometric view of an apparatus for measuring static attitude and scanning a plurality of lines in a head suspension with a laser beam to affect the static attitude of the head suspension in accordance with, the present invention.

In order to assess the magnitude of any pitch and/or roll errors in the static attitude of head suspension 10, static attitude is typically measured, and pitch and roll errors in the static attitude assessed, prior to the head slider being mounted to the head suspension and prior to the head suspension being mounted in a disk drive. An apparatus 70 useful in this regard is shown in FIG. 23 (described in more detail below). In a typical measurement operation, either the head suspension 10 or a specific component of the head suspension 10 (such as flexure 40) is placed in a "loaded" state by clamping mechanism 72 to simulate the fly height of a head slider, and the orientation of a slider bond pad to which a head slider can be later attached is measured by probe 74. Errors in the pitch and roll direction are then assessed. It is also contemplated that static attitude can be assessed after a head slider is attached to a head suspension in a similar manner. In either event, once pitch and roll errors for the static attitude of a head suspension are known, it is desirable to correct the pitch and roll errors if they are greater than a predetermined tolerance in order to increase the yield of useful parts from the head suspension manufacturing process.

Figure 3:
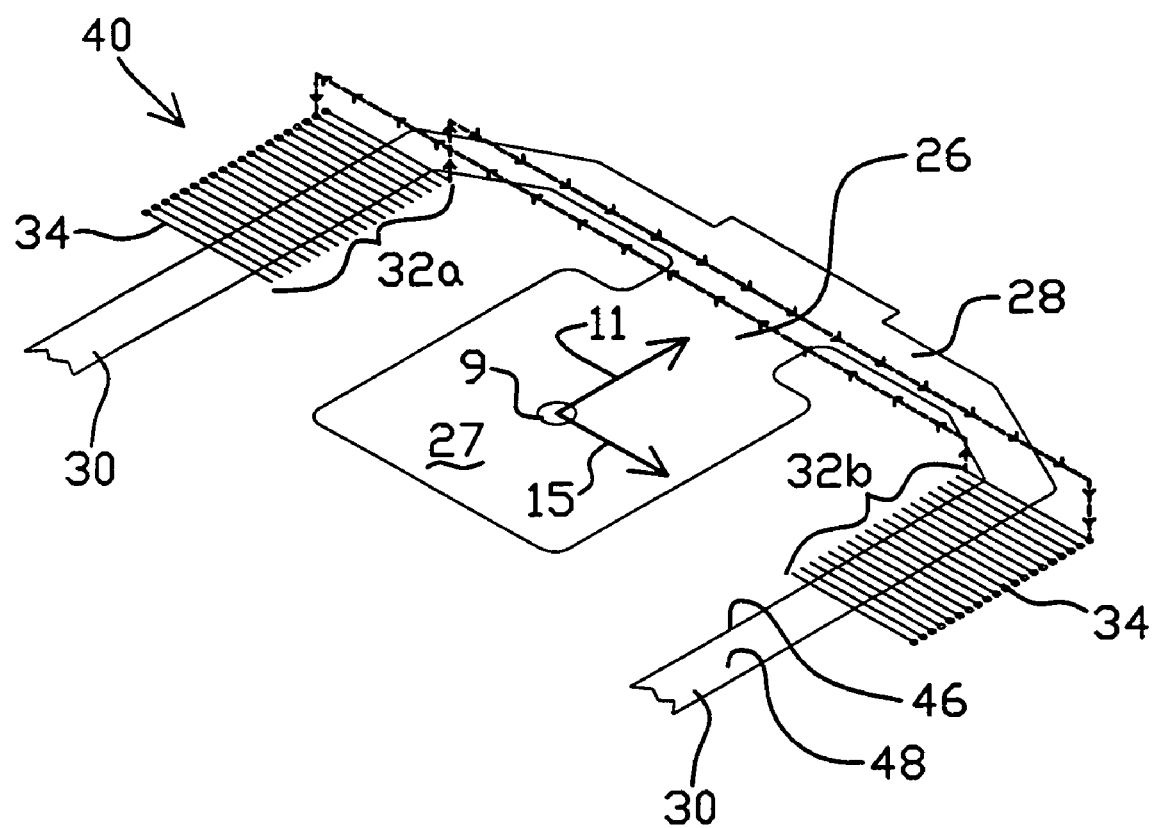
FIG. 3 is an isometric view of a portion of a head suspension flexure showing a plurality of lines scanned in the spring arms of the flexure in accordance with the present invention to effect pitch corrections in static attitude.
Figure 4:
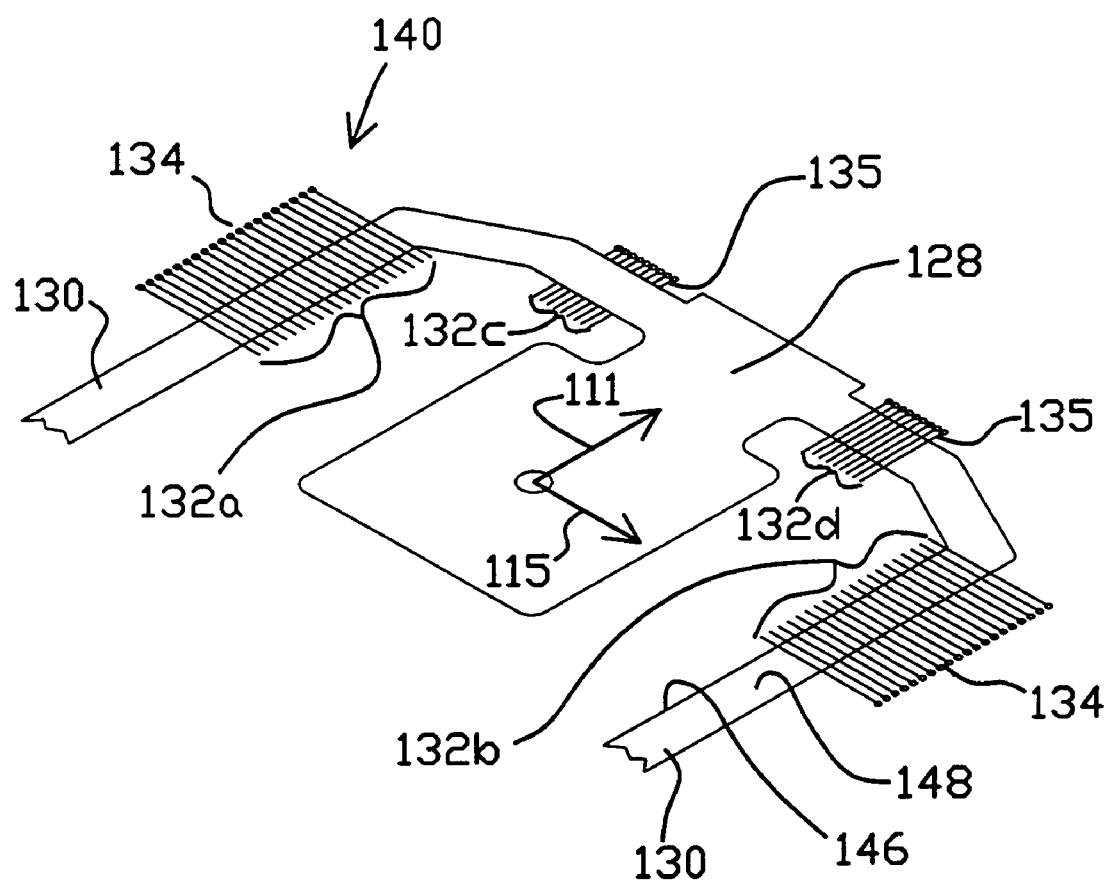
FIG. 4 is an isometric view of a portion of a flexure showing a plurality of lines scanned in the spring arms of the flexure to effect pitch corrections in static attitude and a plurality of lines scanned in the cross piece of the flexure to effect roll corrections in static attitude.
Figure 5:
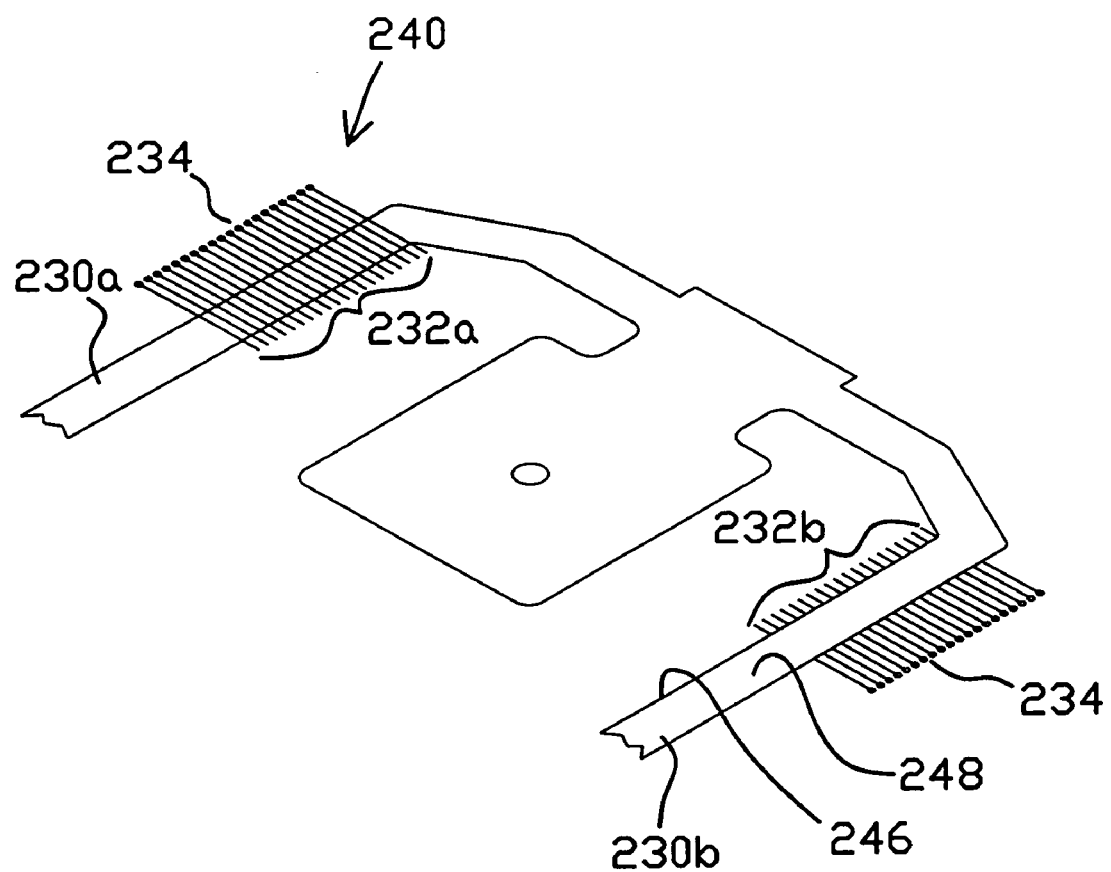
FIG. 5 is an isometric view of a portion of a flexure showing a plurality of lines scanned in the spring arms of the flexure to effect pitch and roll corrections in static attitude.

FIGS. 3–5 illustrate embodiments of a head suspension component, each of which is processed to correct errors in the static attitude of head suspension 10. A distal portion of flexure 40 that is attached to a head suspension in the manner described above in connection with FIGS. 1 and 2 is illustrated in FIG. 3. One or more specific regions of the flexure 40 are scanned with a laser by traversing the laser across the specific regions of the flexure to plastically deform the flexure 40, and thus effect a pitch and/or roll bias in the flexure 40, which will in turn affect the static attitude of head suspension 10 and the dynamic attitude of a head slider (not shown) attached to the flexure 40.

In a preferred embodiment, a continuous wave, focused laser beam traverses and irradiates the flexure 40 to impart heat energy to the flexure and to provide precise microwarping of that portion of the flexure irradiated. In the region scanned by the laser, an elevated temperature isothermal is created on the irradiated surface along the path that the laser traverses on flexure 40. The heated material expands, but is constrained by the cooler material surrounding the scanned area. In this manner, the scanned region undergoes compressive plastic strain, and upon cooling, will curl towards the laser beam. Through the selective scanning of regions of the flexure 40, the flexure 40 can be caused to warp in a predetermined and desired manner, which will in turn provide a desired pitch and/or roll bias to the flexure 40, and thus correct pitch and roll errors in the static attitude of flexure 40 and head suspension 10.

Toward this end, at least one scan region 32, and in the illustrated embodiment a plurality of scan regions 32, are located on flexure 40, which are irradiated with a laser. As shown in FIG. 3, a scan region 32 is located in each of the spring arms 30 of flexure 40 (denoted as scan region 32a and scan region 32b) near a distal end of each of the spring arms 30. A laser (shown in more detail in FIG. 23 and described below) scans at least one of the scan regions 32 of flexure 40 by traversing the scan region 32 in a desired pattern to irradiate the scan region 32 and impart heat to the individual scan region 32.

More to the point, in the embodiment shown in FIG. 3, a laser traverses a plurality of adjacent paths across each of the scan regions 32a and 32b, and thus scans a plurality of lines 34 in each of the scan regions 32a and 32b. Lines 34 are scanned in a direction generally parallel to the transverse axis 15, and lines 34 extend across the entire width of each arm 30. Lines 34 can be spaced apart from each other in a desired manner. Scanning regions 32a and 32b in this manner causes scan regions 32a and 32b to curl upward in a direction toward the surface of arms 30 that is scanned by the laser along each of the lines 34. In this manner, arms 30 are plastically deformed (i.e. warped) in a direction that is generally about transverse axis 15, and a pitch bias is introduced into each of the spring arms 30 at scan regions 32a and 32b.

As shown in FIG. 3, flexure 40 includes a top surface 46 and a bottom surface 48 opposite top surface 46, and a positive or negative warp at scan region 32a and at scan region 32b, and thus a positive or negative bias in pitch static attitude, can be introduced to the individual spring arms 30 of flexure 40 by selectively scanning either the top surface 46 or the bottom surface 48 of the spring arms 30. As shown, slider mounting surface 27 of flexure 40 (to which a head slider is attached) is positioned on the bottom surface 48 of flexure 40. A positive pitch deflection is defined to be an induced warp in the flexure 40 about transverse axis 15 consistent with the right hand rule (i.e. that is toward the surface of a disk over which the flexure 40 is mounted). That is, lines 34 scanned on the bottom surface 48 of flexure 40 will cause the scan regions 32a and 32b to curl in a direction toward the surface of the disk, thus inducing a positive pitch bias in the orientation provided by the flexure 40 to the head slider. The amount of positive pitch bias introduced is tailored to correct a negative pitch error in static attitude. Alternatively, lines 34 scanned on a top surface 46 of flexure 40 will induce a warp in an opposite, or negative, direction. This negative pitch bias can be tailored to correct a positive pitch error in static attitude.

In the embodiment of FIG. 3, scan regions 32a and 32b are identified on the same surface of the flexure 40 (i.e. the bottom surface 48 of arms 30 to induce a positive pitch deflection), and are identified at a position on each of the spring arms 30 that is approximately the same distance from the distal end of flexure 40. That is, scan regions 32a and 32b are sized to be substantially of equal length as measured longitudinally, and are substantially aligned with each other along a transverse axis of the flexure. By identifying scan regions 32a and 32b in this manner (i.e. aligned and on the same surface of flexure 40) a bias that is comprised primarily of only a pitch deflection can be obtained. The scan regions 32a and 32b could be identified at different locations along the length of each spring arm 30, they can be sized differently or they can be identified on different surfaces of flexure 40 to produce a bias comprised of both pitch and roll components. Scanning the same surface of both spring arms 30 with lines 34 that are parallel to the pitch axis 15 as opposed to scanning lines that are angled from pitch axis 15 also helps induce a deflection in the flexure 40 that is primarily comprised of a pitch correction. However, lines 34 could be angled relative to axis 15 to produce both a pitch and roll bias.

FIG. 4 shows an embodiment of a flexure wherein both a pitch and a roll bias are induced in a flexure 140 to account for pitch and roll static attitude errors in accordance with the present invention. More specifically, a distal portion of flexure 140 that is attached to a head suspension in the manner described above is shown. Scan regions 132a and 132b are identified on a bottom surface 148 of flexure 140 near the distal ends of spring arms 130 of flexure 140. In the manner described above in connection with FIG. 3, a plurality of lines 134 can be scanned in regions 132a and 132b to induce a positive pitch bias in the flexure 140, and thus overcome negative pitch errors in static attitude. Additional scan regions 132c and 132d are identified on cross piece 128 of flexure 140. Scan region 132c is identified on top surface 146 of flexure 140, while scan region 132d is identified on bottom surface 148 of flexure 140. Scan regions 132c and 132d are also scanned by a laser, e.g. scanning a plurality of parallel lines 135 in regions 132c and 132d, to induce a roll bias in the flexure 140. That is, a plurality of lines 135 that are parallel to the longitudinal axis 111 of flexure 140, that extend across the entire width of cross piece 128, and that are spaced apart from each other in a desired manner are scanned in region 132c, while a similar plurality of lines 135 are scanned in region 132d. The lines 135 scanned in region 132c will cause cross piece 128 to warp in a direction toward the top surface 146, while the lines 135 scanned in region 132d will cause the cross piece to warp in a direction toward bottom surface 148. In this manner, the flexure 140 is twisted by the torsional forces exerted by these warped regions, and a roll bias is thus induced in the orientation of flexure 140. The amount of roll bias induced in flexure 140 is tailored to account for a desired amount of roll error in the static attitude provided by the head suspension to which the flexure 140 is attached.

In the embodiment of FIG. 4, scan regions 132c and 132d are spaced apart from longitudinal axis 111 by an approximately equal amount (i.e. scan regions 132c and 132d are symmetric with respect to central longitudinal axis 111), and the number of lines 135 scanned in each region 132c and 132d can be approximately equal to provide symmetric torsional forces about longitudinal axis 111. The scan regions 132c and 132d can alternatively be chosen to provide varying torsional effects to the flexure 140 as desired by a specific application, such as by positioning scan regions 132c and 132d at different positions relative to axis 111 or by scanning a different number of lines 135 in regions 132c and 132d to impart a greater or lesser amount of total warp caused by lines 135, and thus tailor the amount of roll bias induced as desired by a specific application. That is, scan region 132c could be scanned with a greater number of scan lines 135 than are scanned in region 132d to control the torsional effect of the scanning process. This could include scanning no lines 135 in either scan region 132c or 132d if desired.

As with the pitch bias introduced by the scanning of regions 132a and 132b, regions 132c and 132d can be selected to induce either a positive or a negative roll bias into the static attitude of flexure 140. In the embodiment shown in FIG. 4 wherein region 132c is identified in top surface 146 to the left of axis 111 (as viewed distally along axis 111) and scan region 132d is identified in bottom surface 148 to the right of axis 111, a negative roll bias is induced about axis 111, consistent with the right hand rule (i.e. the warp caused by the scan lines 135 applied to regions 132c and 132d twists the flexure in a direction that is counterclockwise as viewed distally along the longitudinal axis 111). Scanning the opposite surfaces of cross piece 128 (i.e. defining region 132c on the bottom surface 148 to the right of axis 111 and region 132d on top surface 146 to the top of axis 111) would induce a positive roll bias.

FIG. 5 shows another embodiment of a portion of a flexure 240 processed in accordance with the present invention to affect the static attitude of a head suspension to which flexure 240 is attached. A pair of scan regions 232a and 232b are defined on the spring arms 230 of the flexure 240. Specifically, scan region 232a is defined in a bottom surface 248 of spring arm 230a, while scan region 232b is defined in a top surface 246 of spring arm 230b. A plurality of lines 234 are scanned in each of the scan regions 232a and 232b.

Scan region 232a will warp in a downward direction toward bottom surface 248, while scan region 232b will warp in an upward direction toward top surface 246. By defining scan regions 232a and 232b in opposing surfaces of the spring arms 230, a roll bias can be induced due to the differing directions of the warp induced by the scanning of the plurality of lines 234. Moreover, depending on the number of lines 234 scanned in each of the scan regions, the amount of warp experienced by the regions 232a and 232b can either be the same, resulting in a net pitch bias that is approximately zero, or it can be different in order to impart a net pitch bias in either the positive or negative direction as may be desired.

Figure 19:
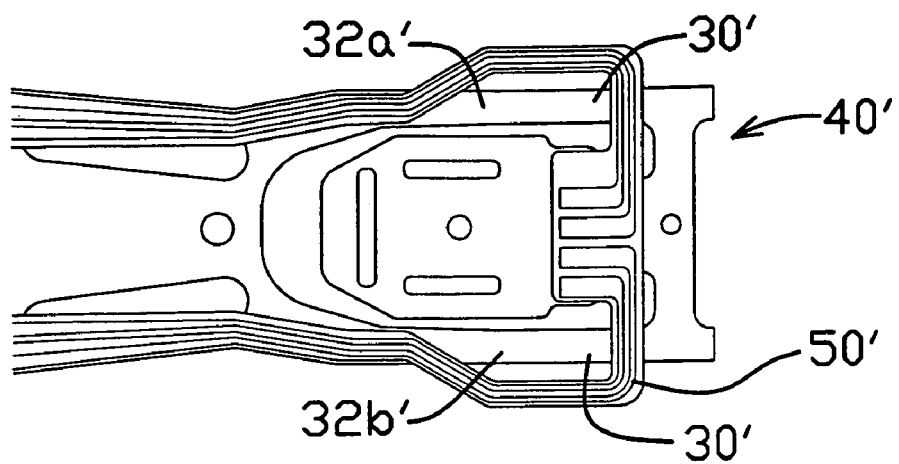
FIG. 19 is a planar view of a portion of a flexure showing one configuration of a trace assembly on the flexure useful in the present invention.

For simplicity, the flexures 40, 140, and 240 of FIGS. 3–5 are shown without a conductive trace assembly routed over the respective flexures. In actual use, conductive leads, such as a conductive trace assembly, a flexible circuit, or conductive wires, are provided to enable the reading and/or writing of data by a head slider attached to the flexure. In one preferred embodiment, a conductive trace assembly is routed along the suspension component processed in the manner described above so that the conductive trace does not cross scan regions that are located in the head suspension component. It has been found that locating scan regions over which a conductive trace assembly is routed may reduce the amount of deflection achieved. This is because the conductive layer of material may block part of the laser energy. In addition, since the conductive and insulating layers of material are not being micro-warped, the resist the warping of the underlying head suspension component. FIG. 19 thus illustrates a preferred configuration for a flexure 40' and a conductive trace assembly 50' wherein trace assembly 50' is routed along the spring arms 30' of flexure 40' until it approaches the distal portion of the flexure. Near the distal portion of flexure 40' the trace assembly 50' is routed off of the surface of spring arms 30' and extends adjacent to the spring arms 30'. Scan regions 32a' and 32b' are located on the spring arms 30' at a location wherein the trace 50' extends parallel and adjacent to the arms 30', and thus trace assembly 50' is not scanned during the static attitude adjustment process described herein.

Figure 20:
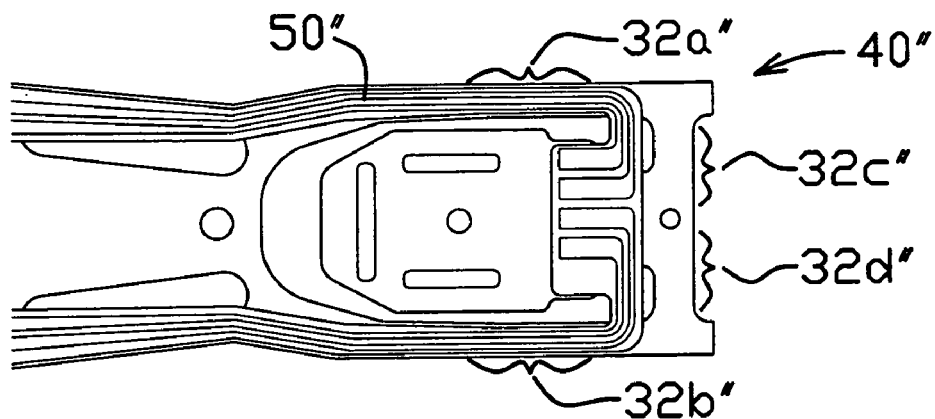
FIG. 20 is a planar view of a portion of a flexure showing an alternative trace assembly on the flexure useful in accordance with the present invention.
Figure 21:
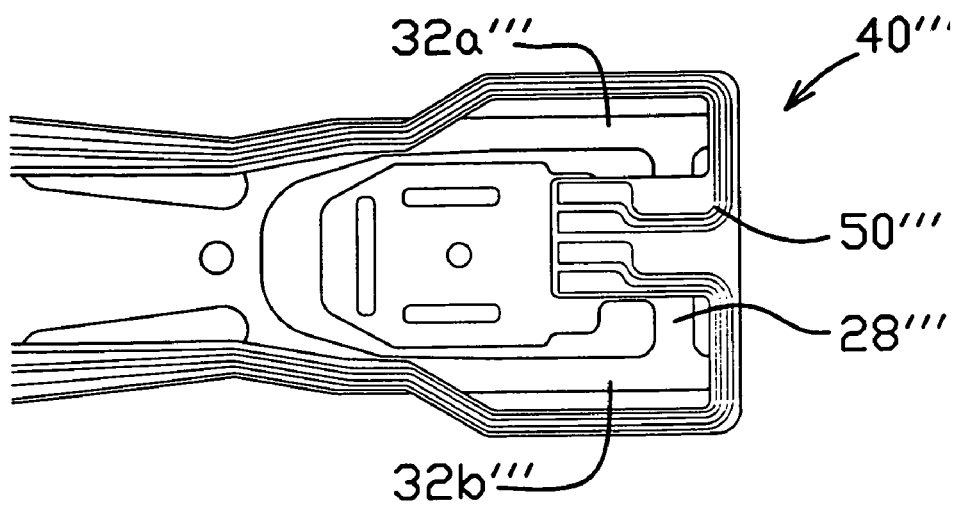
FIG. 21 is a planar view of a portion of a flexure showing an alternative trace assembly on the flexure useful in accordance with the present invention.

It is contemplated that other configurations for the conductive trace assembly can be used in accordance with the principles of the present invention, and FIGS. 20 and 21 illustrate such alternative embodiments. In FIG. 20, a trace assembly 50" extends along the length of spring arms 30" of flexure 40", and the scan regions 32a" and 32b" are defined in a manner that the trace assembly 50" is scanned along with the spring arms 30". Trace assembly 50" is routed distally of cross-piece 28", and scan regions 32c" and 32d" can be located so that trace assembly 50" is not scanned by the laser. FIG. 21 shows a third embodiment of a flexure 40''' wherein the conductive trace 50''' extends adjacent to arms 30''' and beyond cross-piece 28''' of flexure 40'''.

While FIGS. 3–5 show a plurality of adjacent paths (i.e. a plurality of lines) scanned in the desired scan regions, these regions can be scanned with one or more paths having any number of different shapes to produce a desired warp in the head suspension. For example, with sufficient analysis, a non-linear pattern of scan lines could be scanned to compensate for pitch and/or roll errors in a simultaneous fashion. In addition, rather than scanning individual lines in the specified scan regions, the laser could traverse and scan a continuous pattern that traces a desired configuration along the length of a scan region to create a desired warp (and thus a pitch and/or roll bias) in the scan region.

Figure 22:
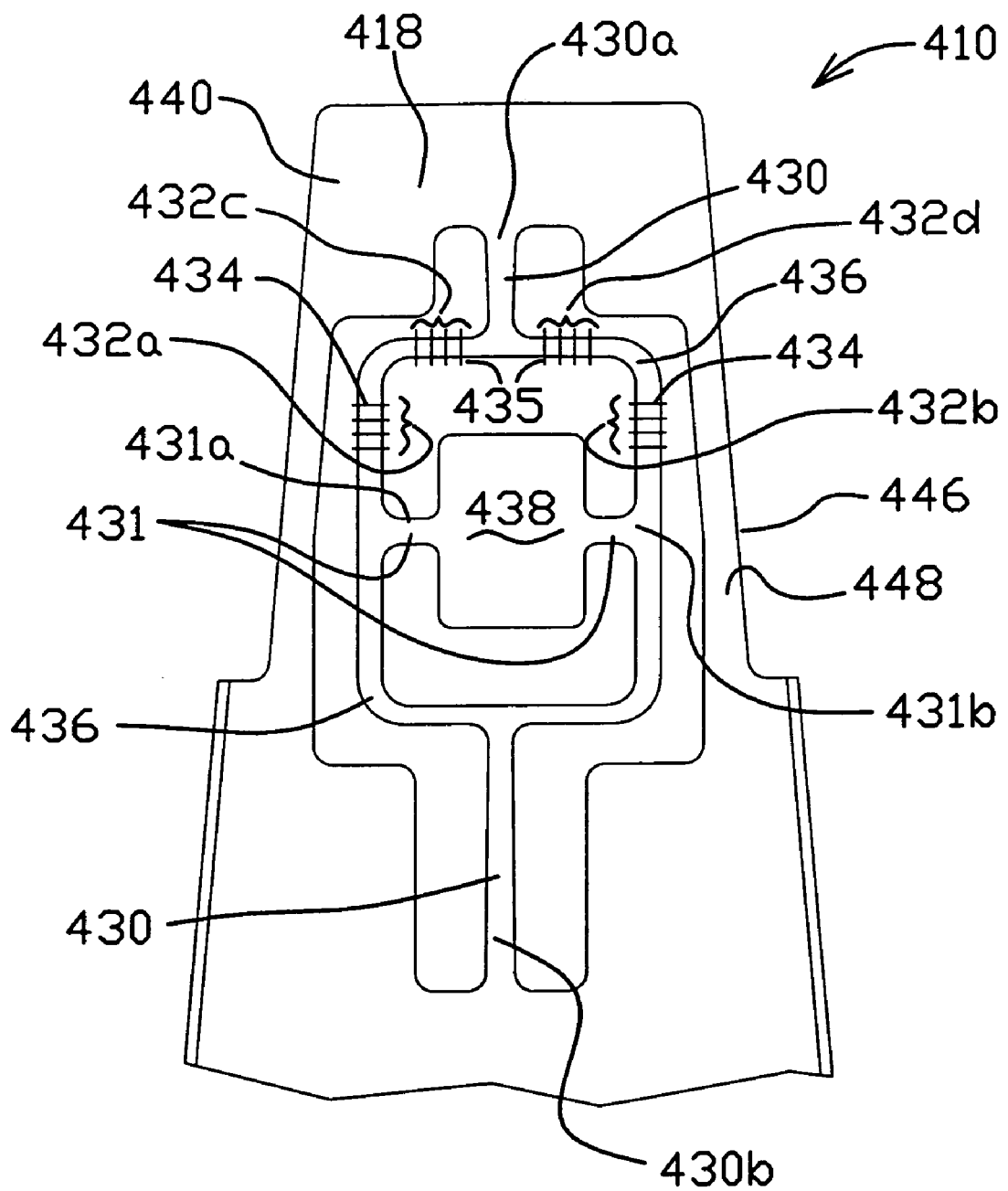
FIG. 22 is a planar view of a portion of a two piece head suspension having a load beam and an integral flexure showing a plurality of lines scanned in the integral flexure in accordance with the present invention.

Moreover, while FIGS. 3–5 show a flexure that is part of a three piece head suspension design, the static attitude of a two piece head suspension having an integral flexure can be adjusted in a manner similar to that described above. FIG. 22 illustrates a portion of a head suspension 410 having an integral flexure 440. Flexure 440 includes a first set of torsion arms 430 and a second set of torsion arms 431. First set of torsion arms 430 is comprised of arms 430a and 430b, and are interconnected between an outer frame 418 and inner spring arms 436. Second set of torsion arms 431 is comprised of arms 431a and 431b, and are interconnected between the inner spring arms 436 and a slider mounting platform 438. The first set of torsion arms 430, the second set of torsion arms 431, and the inner spring arms 436 are sufficiently resilient to permit the slider mounting platform 438 (and a head slider attached thereto) to gimbal in response to fluctuations in the air bearing as the suspension 410 and slider fly over a rotating disk in a disk drive.

Because of the configuration of flexure 440, a static attitude adjustment is preferably accomplished by torsionally rotating the first and second set of torsion arms 430 and 431, respectively, in a desired manner to cause a pitch and roll bias in the static attitude of mounting platform 438 of suspension 410. As illustrated in FIG. 22, then, scan regions 432a and 432b can be located in a bottom surface 448 on the longitudinal portion of inner spring arms 436. A plurality of lines 434 can be scanned in scan regions 432a and 432b with a laser beam to warp the regions 432a and 432b in a desired manner. As shown in FIG. 22, scanning a plurality of lines 434 in scan regions 432a and 432b will cause the torsion arms 431 to twist, which will impart a pitch bias to the slider mounting region 438. The direction of the pitch bias (i.e. positive or negative) can be altered by defining regions 432a and 432b in the respective opposite surfaces of the flexure 440 or by locating scan regions 432a and 432b either proximally or distally of torsion arms 431.

Scan regions 432c and 432d can be identified in the transverse portion of inner spring arms 436 to effect a roll bias in the static attitude of head suspension 410 in a similar manner. Region 432c and region 432d are located on bottom surface 448 of spring arms 436, and a plurality of lines 435 are scanned in these regions to warp the regions, and thus induce a roll bias through torsion arms 430 in the static attitude of head suspension 410. The direction of the roll bias can be controlled by locating the scan regions on the appropriate surface (i.e. top or bottom) or on the appropriate portion of spring arms 436 (i.e. proximal or distal of torsion arms 431). Scan regions can also be identified in other portions of flexure 440, such as in one or both sets of torsion arms 430 and 431 to effect pitch and/or roll static attitude corrections as desired.

The amount of scanning performed on the one or more regions of a head suspension, and thus the amount of warp that is induced, is dependent upon a number of variables, each of which can be controlled as needed by a desired application to optimize the scanning process. One constraint on the amount of scanning performed on a head suspension in a static attitude compensation process is the amount of pitch and/or roll correction that is needed to overcome pitch and roll errors in the static attitude of the head suspension. A second constraint on the amount of scanning performed may be that the head suspension not be permanently marked during the correction process, which will diminish the aesthetic appearance of the part. In the embodiments of FIGS. 3–5, the head suspension is scanned with a plurality of lines using a laser beam having a predetermined size and intensity. Moreover, the plurality of scan lines are spaced apart to control the amount of localized heat applied to the head suspension at each of the individual lines, and the rate at which the laser traverses the head suspension in scanning the scan regions is controlled in a desired manner to control the amount of heat applied to the head suspension. In other words, the amount of scanning performed on a head suspension will vary with the size and intensity of the laser beam, the spacing between the lines scanned by the laser beam, the number of lines scanned by the laser, and the rate at which the lines are scanned. The physical configuration of the head suspension (i.e. part width and thickness) will also play a part in the amount of angular deflection the head suspension experiences for a given amount of scanning. For a specific suspension configuration, then, beam size, intensity, number of scan lines, and scan rate can be optimized as necessary to induce the proper amount of pitch and/or roll correction while not permanently marking the head suspension part.

The amount of scanning that needs to be performed on a head suspension to effect a desired deflection can be experimentally obtained and stored for later reference by holding certain of the variables described above that affect the heat imparted to the component constant while varying other variables. For example, using the flexure of FIG. 3 to illustrate wherein a plurality of lines 34 are scanned in the head suspension, the beam size and beam intensity of the laser used to scan lines 34, the spacing between individual lines 34, and the rate at which the head suspension is scanned can all be held constant, while the number of lines 34 that are scanned, and thus the size of scan regions 32a and 32b, is varied to experimentally determine the deflection obtained from a given number of lines that are scanned in a specific region of flexure 40. The resulting angular deflection is then measured and a response curve depicting deflection as a function of the number of scan lines for a scan region on a bottom surface 48 of a spring arm 30 for a given laser beam size, intensity, and scan rate can be obtained. Similar response curves for a scan region on a top surface 46 of a spring arm 30 and for scan regions on the top and bottom surfaces of cross piece 28 of flexure 40 can be obtained for a given laser beam size, intensity, and scan rate.

FIGS. 7, 9, 11, 13, 15, and 17 illustrate the results of such an investigation wherein different portions and surfaces of a specific head suspension configuration were scanned with a varying number of lines while other variables that affect the heat imparted to the scan regions were held constant to determine the pitch and roll deflection that result at each specific scan region. For each of the plots shown in FIGS. 7, 9, 11, 13, 15 and 17, laser beam power, the scan speed of the laser as it traverses the head suspension, the diameter of the laser beam, the wavelength of the laser, and the spacing between the adjacent scan lines were held constant while different scan regions of a flexure were scanned with a varying number of scan lines. In the embodiments shown in FIGS. 3–5, the power of the laser beam was either 6.2 watts (for scans made in the bottom surface of the head suspension) or 7.2 watts (for scans made in the top surface of the head suspension), and the scan speed was 1.1 meters per second. The difference between the power for the top and bottom lasers is due to differing optics attached to the lasers, and identical power can be used for lasers provided with similar optics. The diameter of the laser beam was set at 35 micrometers with a wavelength of 1100 nm. The spacing between individual scan lines was set at 30 micrometers.

Figure 7:
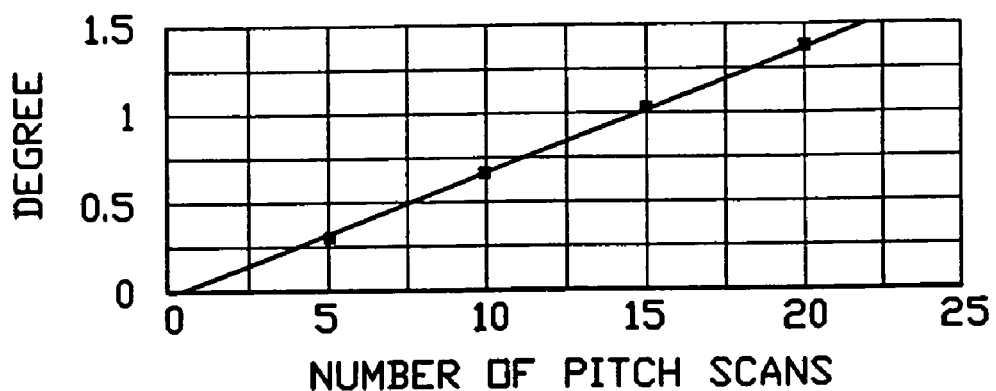
FIG. 7 is a plot of a coarse adjustment to pitch static attitude showing angular deflection about a pitch axis as a function of the number of lines scanned on a bottom surface of a spring arm of a flexure.
Figure 8:
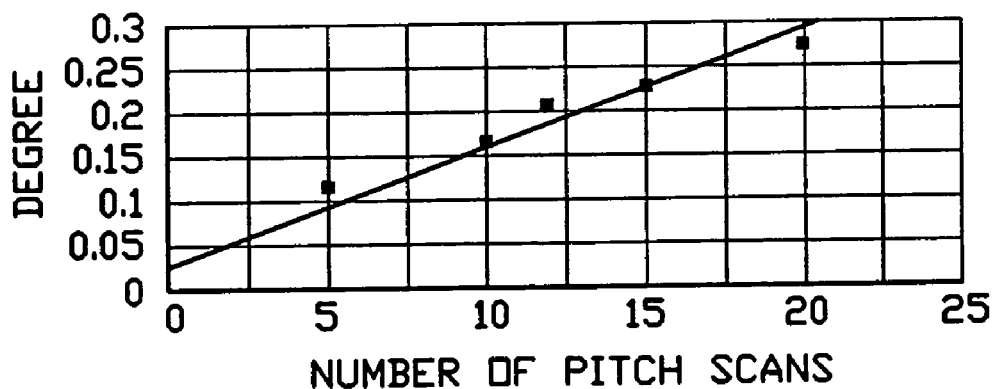
FIG. 8 is a plot of a fine adjustment to pitch static attitude showing angular deflection about a pitch axis as a function of the number of lines scanned in the bottom surface of a spring arm after a coarse adjustment has already been made to the spring arm.
Figure 9:
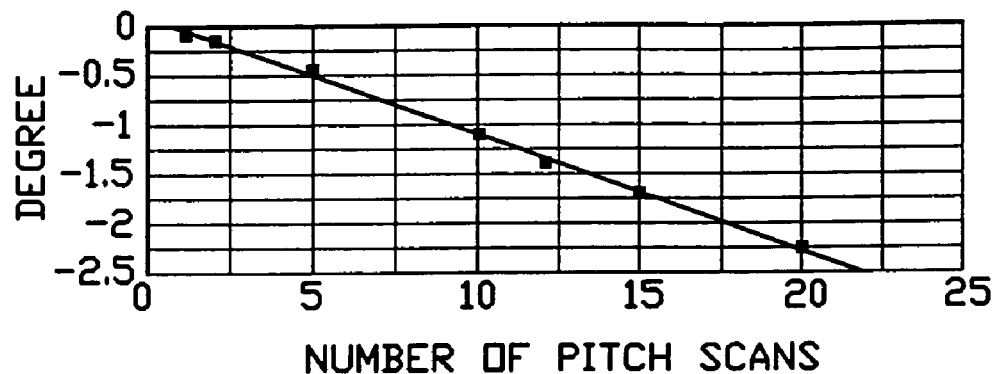
FIG. 9 is a plot of a coarse adjustment to pitch static attitude showing angular deflection about a pitch axis as a function of the number of lines scanned on a top surface of a spring arm of a flexure.
Figure 10:
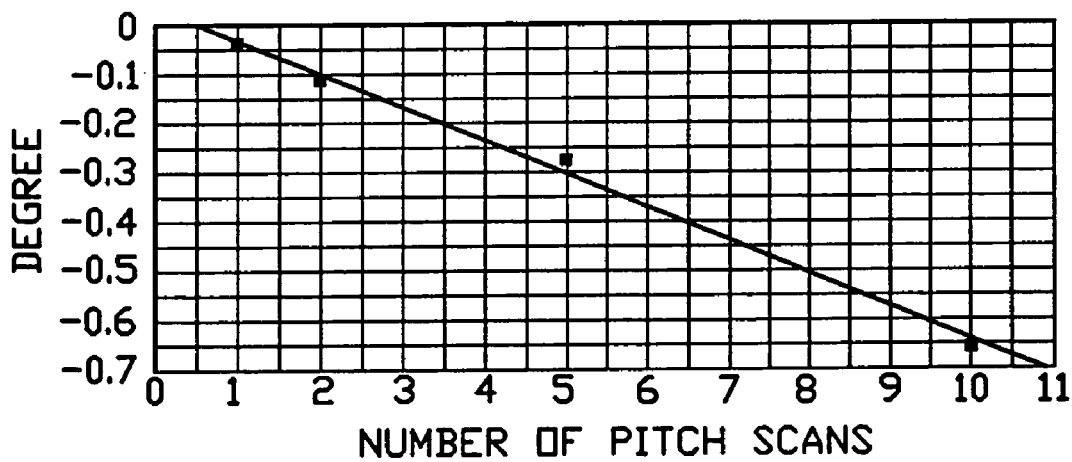
FIG. 10 is a plot of a fine adjustment to pitch static attitude showing angular deflection about a pitch axis as a function of the number of lines scanned in the top surface of a spring arm after a coarse adjustment to the spring arm has been made.
Figure 11:
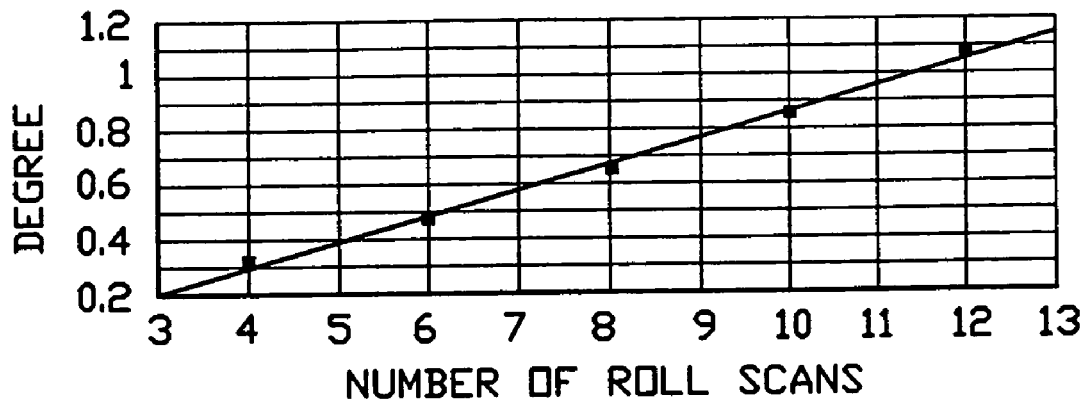
FIG. 11 is a plot of a coarse adjustment to roll static attitude showing angular deflection about a roll axis as a function of the number of lines scanned in a bottom right surface of a flexure cross piece.
Figure 12:
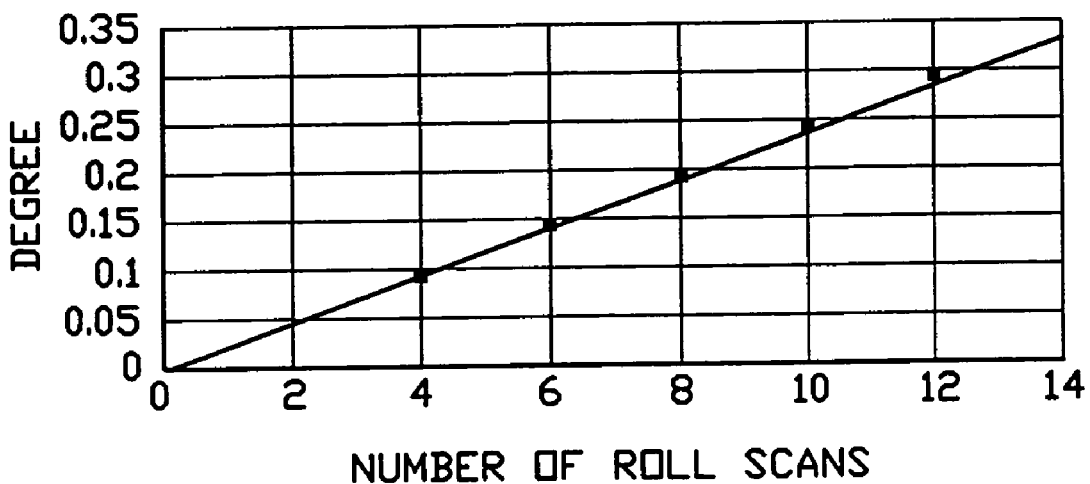
FIG. 12 is a plot of a fine adjustment to roll static attitude showing angular deflection about a roll axis as a function of the number of lines scanned in a bottom right surface of a flexure cross piece after a coarse adjustment has been made to the flexure cross piece.
Figure 13:
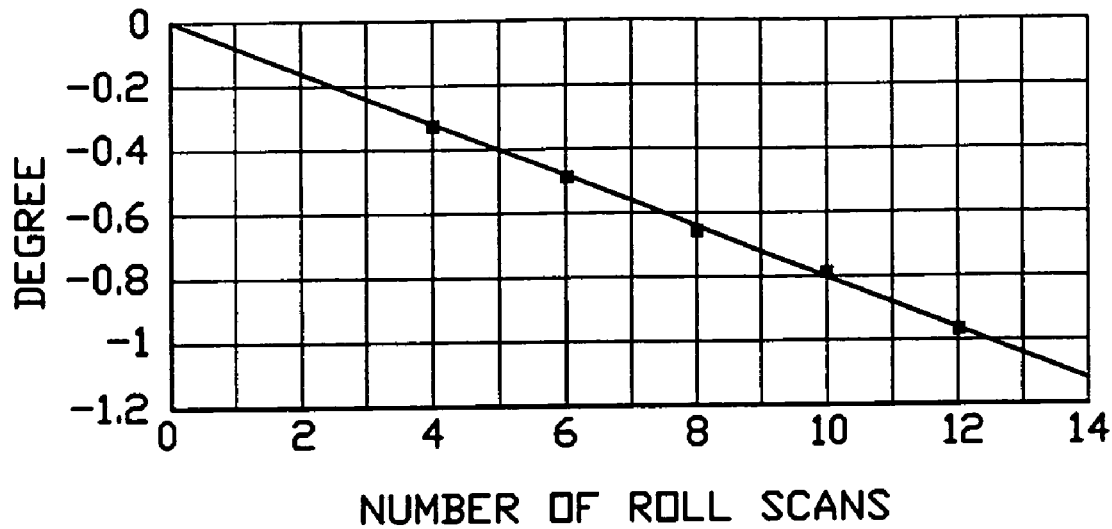
FIG. 13 is a plot of a coarse adjustment to roll static attitude showing angular deflection about a roll axis as a function of the number of lines scanned on a bottom left surface of a flexure cross piece.
Figure 14:
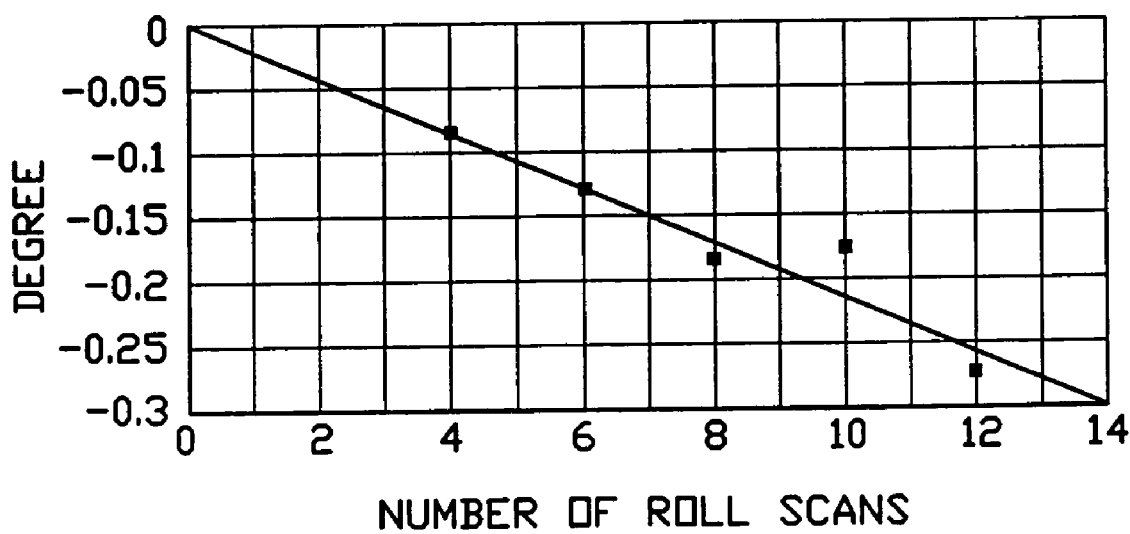
FIG. 14 is a plot of a fine adjustment to roll static attitude showing angular deflection about a roll axis as a function of the number of lines scanned the bottom left surface of a flexure cross piece after a coarse adjustment has been made to the flexure cross piece.
Figure 15:
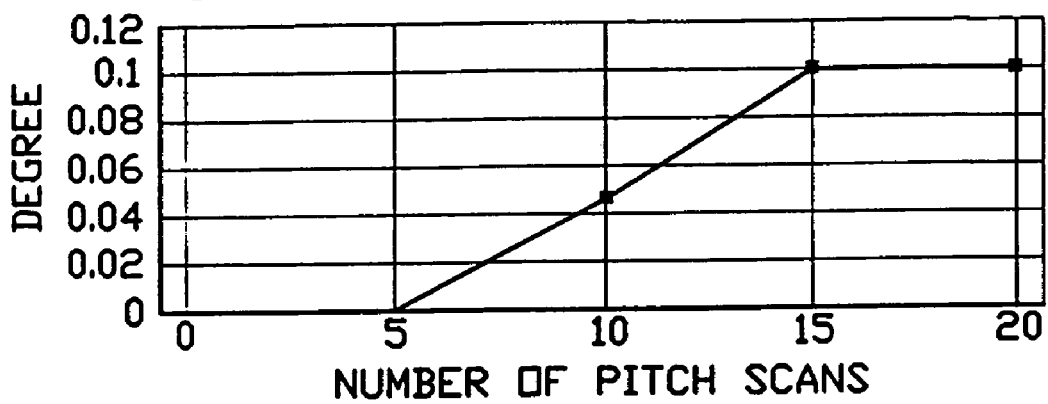
FIG. 15 is a plot of a coarse adjustment to roll static attitude showing angular deflection about a roll axis as a function of the number of lines scanned in a top surface of a spring arm of a flexure.
Figure 16:
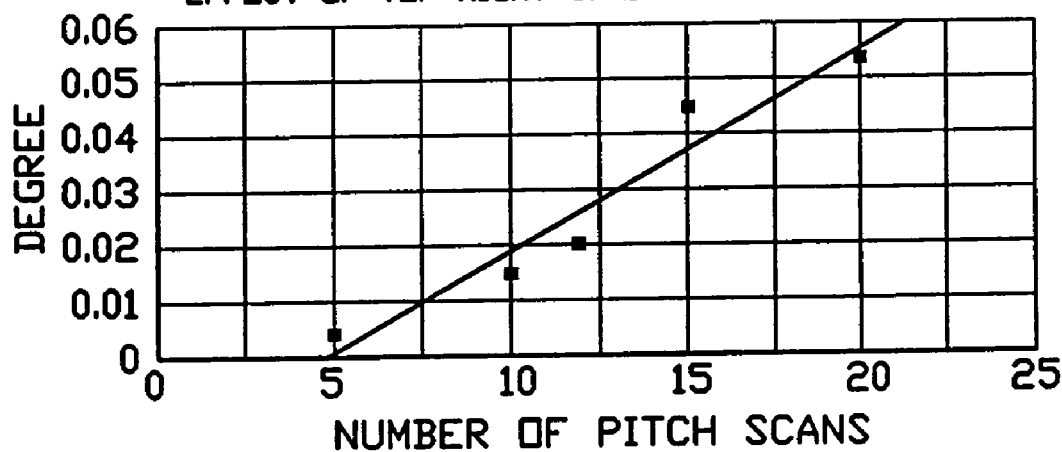
FIG. 16 is a plot of a fine adjustment to roll static attitude showing angular deflection about a roll axis as a function of the number of lines scanned in a top surface of a flexure spring arm after a coarse adjustment to the flexure spring arm has been made.
Figure 17:
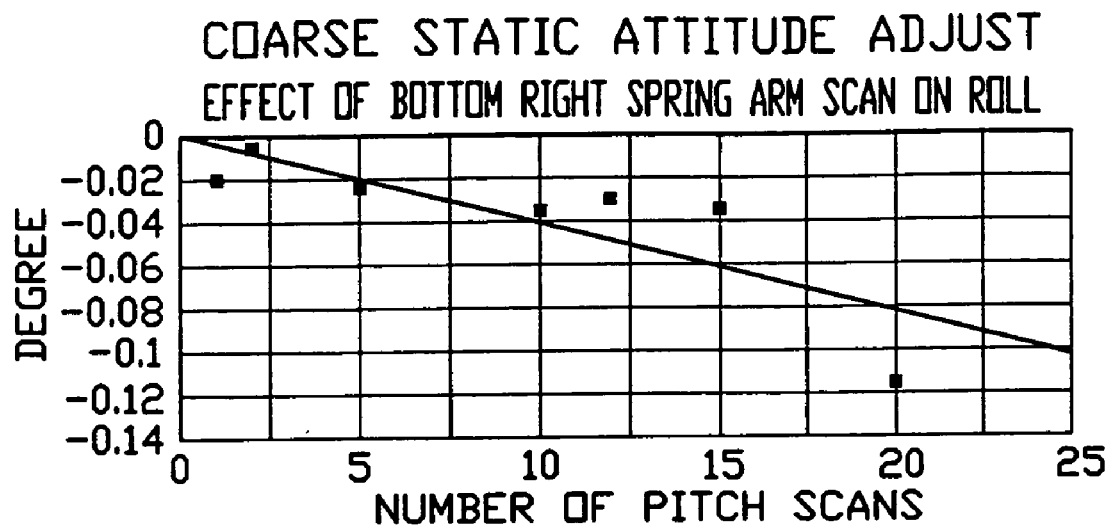
FIG. 17 is a plot of a coarse adjustment to roll static attitude showing angular deflection about a roll axis as a function of the number of lines scanned in a bottom surface of a flexure spring arm.
Figure 18:
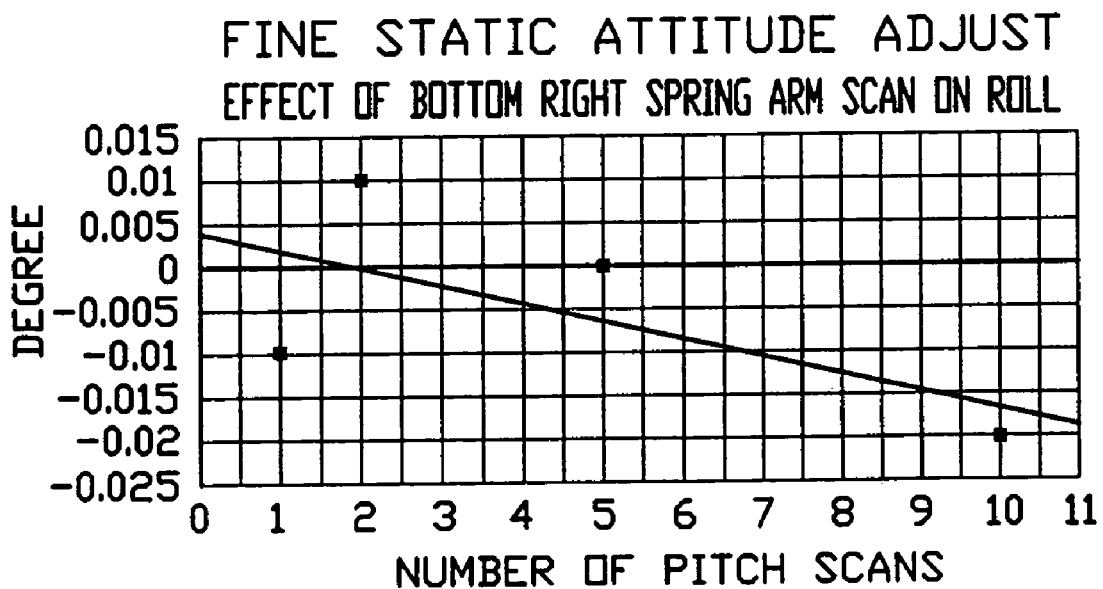
FIG. 18 is a plot of a fine adjustment to roll static attitude showing angular deflection about a roll axis as a function of the number of lines scanned in the bottom surface of a flexure spring arm after a coarse adjustment has been made to the spring arm.

FIG. 7 shows the positive angular pitch deflection obtained as a function of the number of lines scanned in a pair of scan regions located in a bottom surface of the spring arms of a head suspension flexure (for example, scan regions 32a or 32b of flexure 40 of FIG. 3). The number of scan lines represents the number of lines scanned in each of the scan regions, and the angular deflection is measured about a pitch axis located at the head suspension load dimple. FIG. 9 shows the negative angular pitch deflection as a function of the number of lines scanned in regions located in a top surface of the spring arms of a flexure. FIG. 11 shows the positive angular roll deflection obtained as a function of the number of lines scanned in a cross piece of a flexure, with the scan region located to the right of the longitudinal axis (as viewed distally) and on the top surface of the flexure. FIG. 13 shows the negative angular roll deflection obtained a function of the number of lines scanned in a cross piece of a flexure with the scan region located to the left of the longitudinal axis and on the top surface of the flexure. FIG. 15 shows the positive angular roll deflection as a function of the number of lines scanned in a region located on a top surface of a flexure spring arm. FIG. 17 shows the negative angular roll deflection as a function of the number of lines scanned in a region located on a bottom surface of a flexure spring arm. As shown in these figures, pitch corrections of up to 1.5° and roll corrections of up to 1.2° are common. Pitch corrections of up to 2.5° and roll corrections of up to 1.5° have been achieved.

Once the response curves shown in FIGS. 7, 9, 11, 13, 15, and 17 have been obtained for a particular flexure configuration and laser operating conditions, the curves can be analyzed to determine a mathematical equation for each of the response curves. The data of these Figures is primarily linear, and thus a first order equation can be developed to characterize each of these response curves. The response curves advantageously allow a prediction/correction methodology to be followed during the manufacture of a head suspension generally, and specifically during static attitude corrections. That is, the error in static attitude of a head suspension can be measured, and the appropriate location of the scan region(s) can be determined based on the necessary correction (e.g. a bottom surface of a flexure spring arm to provide a positive pitch deflection). The response curves and corresponding equations can be used to determine the approximate number of lines to be scanned in the region(s) necessary to effect a desired angular deflection. The scan region(s) are then scanned with the appropriate number of lines to approximately achieve the amount of pitch and/or roll correction that is needed.

Such a methodology is preferably used as part of a closed loop process to provide precise micro-warping of a head suspension component, such as the flexures 40, 140, and 240 shown in FIGS. 3–5. Once a region of a head suspension has been scanned with a laser, the region can be again scanned to cause additional deflection of the scan region if necessary. The scanning of a region that has been previously scanned will typically produce an angular deflection from the second scanning process that is less than the angular deflection achieved from the time the region is scanned. The amount of scanning (e.g. the number of lines scanned) is typically lower for the second scanning process. This is because the second scan has to increase the amount of compressive plastic deformation already induced in the irradiated material by the first scan operation, and also to increase the amount of elastic stress in the opposite, non-irradiated surface.

Additional scanning of the identified region can be done (i.e. third and fourth scans) if desired, with each successive scanning operation producing an incrementally smaller warping of the region than the immediately preceding scanning operation. In this manner, increasingly precise static attitude adjustments can be made. It has been determined, however, that scanning an individual region twice is typically sufficient to meet manufacturing requirements for static attitude accuracy. The first scanning of a region in a head suspension component is referred to as a "coarse" static attitude adjustment, while the second scanning of the region is referred to as a "fine" static attitude adjustment.

FIGS. 7, 9, 11, 13, 15, and 17 described above each illustrate either a coarse pitch static attitude adjustment or a coarse roll static attitude adjustment for a head suspension. As with FIGS. 7, 9, 11, 13, 15, and 17 described above, data describing the relationship between the amount of scanning performed to a specific scan region a second time and the angular deflection that is achieved can be generated and stored for later reference. That is, response curves for a particular head suspension that illustrate the amount of angular deflection effected during a fine static attitude adjustment process can be experimentally obtained as a function, for example, of the number of lines scanned by holding other variables that affect the amount of deflection obtained constant. Plots of the response curves for a fine static attitude adjustment are shown in FIGS. 8, 10, 12, 14, 16, and 18.

As with FIGS. 7, 9, 11, 13, 15, and 17, laser power, scan speed, laser beam diameter, laser wavelength, and spacing between individual scan lines were held constant while the number of scan lines was changed to produce the fine static attitude adjustment curves of FIGS. 8, 10, 12, 14, 16, and 18. The values of the variables held constant in generating the plots of FIGS. 7, 9, 11, 13, 15, and 17 were held at the same values in generating the plots of FIGS. 8, 10, 12, 14, 16, and 18.

Figure 6A:
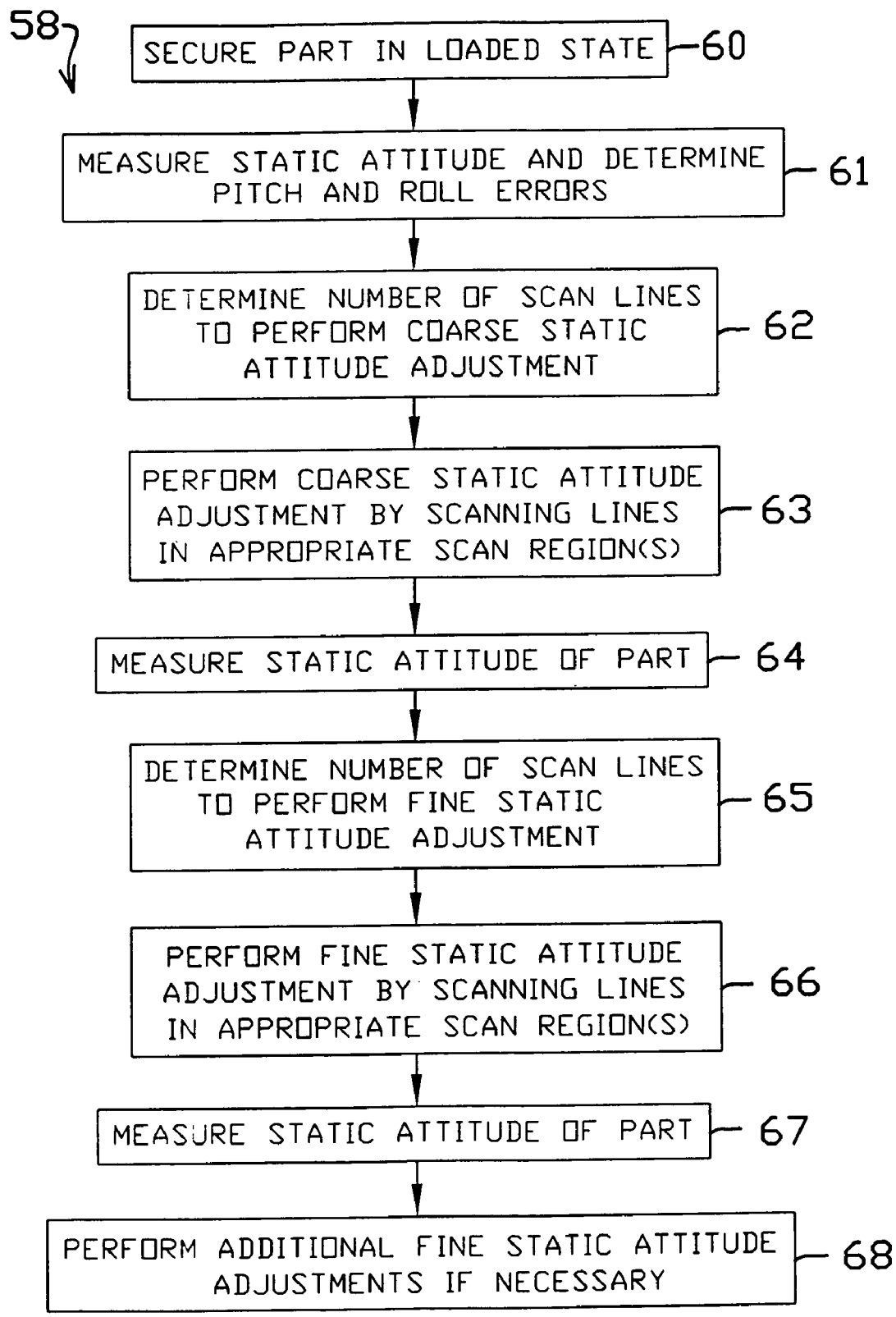
FIG. 6a is a block diagram flow chart illustrating a closed loop, iterative process for providing a precise adjustment to static attitude in accordance with the present invention.

Once the coarse and fine static attitude adjustment data describing the relationship between angular deflection and the amount of scanning performed have been obtained, an iterative, closed loop process for adjusting static attitude to provide precise pitch and/or roll corrections can be performed. That is, an iterative process wherein at least one region of a head suspension is scanned with a laser two times to effect a total desired angular deflection of the scan region can be used to provide precise corrections to head suspension static attitude. A specific application of such an iterative process for correcting static attitude is schematically illustrated in FIG. 6a. More to the point, FIG. 6a is a schematic, block diagram of an iterative process wherein regions are scanned with a plurality of lines multiple times to provide precise static attitude corrections. The coarse and fine adjustment response curves for pitch and roll static attitude corrections as a function of the number of lines scanned in a specific scan region for a given head suspension configuration (shown in FIGS. 7–18) are advantageously used in such a process to provide a prediction/correction/feedback/prediction/correction methodology for static attitude corrections.

In addition, the measuring equipment can be modified so that it operates when the laser beam is irradiating the part. This provides for a real time continuous feedback operation that shows changes in pitch and roll static attitude as they are being effected. Because of the relatively slow speed of current real time measuring apparatus, however, prediction/correction/feedback methodology provides an advantage in processing speed with comparable accuracy to real time measurement methodology.

With specific reference to FIG. 6a, a process 58 performed on a flexure of a head suspension will be described. At first step 60 in the process 58 a head suspension having a flexure is placed in its loaded state on a measurement apparatus to simulate the dynamic attitude a head slider attached to the part would experience under normal operating conditions. Once in its loaded state, at step 61 the static attitude of the head suspension can be measured with a probe, and the pitch and roll errors between the measured static attitude and the desired static attitude are determined. In this regard, the static attitude of the head suspension can be measured using any of a number of known methods, such as with a laser measurement probe (shown in FIG. 23 and described in more detail below). Alternatively, when processing a large number of head suspensions, the nominal static attitude of only the first few head suspensions may be measured. If the static attitudes are sufficiently similar to each other, the static attitude of the remaining head suspensions can be assumed to be that of the first few head suspensions, and this measurement step may not be performed. This is particularly true in view of the iterative correction process described further below.

A coarse static attitude adjustment is shown at steps 62 and 63 wherein the number of scan lines necessary to effect a specific pitch and/or roll adjustment is determined using coarse adjustment response curves and equations that have been previously determined for the head suspension, and the desired number of scan lines are scanned in the appropriate scan regions. As part of step 62, the appropriate scan regions are determined based upon the magnitude and direction of the required pitch and/or roll error. That is, to correct a negative pitch error, scan regions are located on a bottom surface of the flexure spring arms to cause a positive pitch deflection through the scanning of the lines in the scan region(s). The number of scan regions can vary based upon the amount of pitch correction that is necessary.

Also, as part of the process of determining the number of lines to scan in a scan region, it is presently preferred to only correct a portion of the measured pitch and/or roll errors with a coarse static attitude adjustment. That is, rather than attempting to correct the entire pitch or roll static attitude error with a single scanning of lines, the total pitch or roll error to be corrected is reduced by a specific amount. For example, when correcting pitch errors, the appropriate location for the scan region(s) are determined and the number of scan lines to be scanned in the scan region(s) is determined from the coarse pitch adjustment plots and equations based on a desire to achieve a specific percentage of the entire pitch correction with the coarse static attitude adjustment. The scan regions are then scanned with the laser by traversing the scan region with a plurality of scan lines at step 63. A similar operation can be conducted for any roll error that must be accounted for wherein the necessary roll correction, either positive or negative, and the magnitude of the correction are first determined, the proper location for the scan region is determined, and the number of lines to correct a specific percentage of the total roll error is determined from the coarse adjustment plots for roll error. It is presently preferred that the percentage of the pitch and/or roll errors that are corrected be greater than about eighty percent and less than about one hundred percent.

At step 64, the resulting static attitude of the head suspension is again measured after the coarse pitch and roll corrections performed at steps 62 and 63. If the measured static attitude differs from the nomical static attitude by more than a threshold valve, such as 0.05 degrees for example, in either pitch or roll, then a fine static attitude adjust is performed, as shown at steps 65 and 66. That is, the fine adjustment response curves and equations for the specific head suspension part are referenced to determine the number of scan lines required to correct the remaining pitch and/or roll errors at step 65. The appropriate number of lines are then scanned in the previously identified and scanned scan region(s) at step 66. The resulting static attitude is again measured at step 67. Additional scan iterations can be performed if desired in a similar manner, as is shown at step 68. It has been found, however, that two iterations are typically sufficient to correct pitch and roll errors to within acceptable levels, and thus a two iteration process is presently preferred.

Figure 6B:
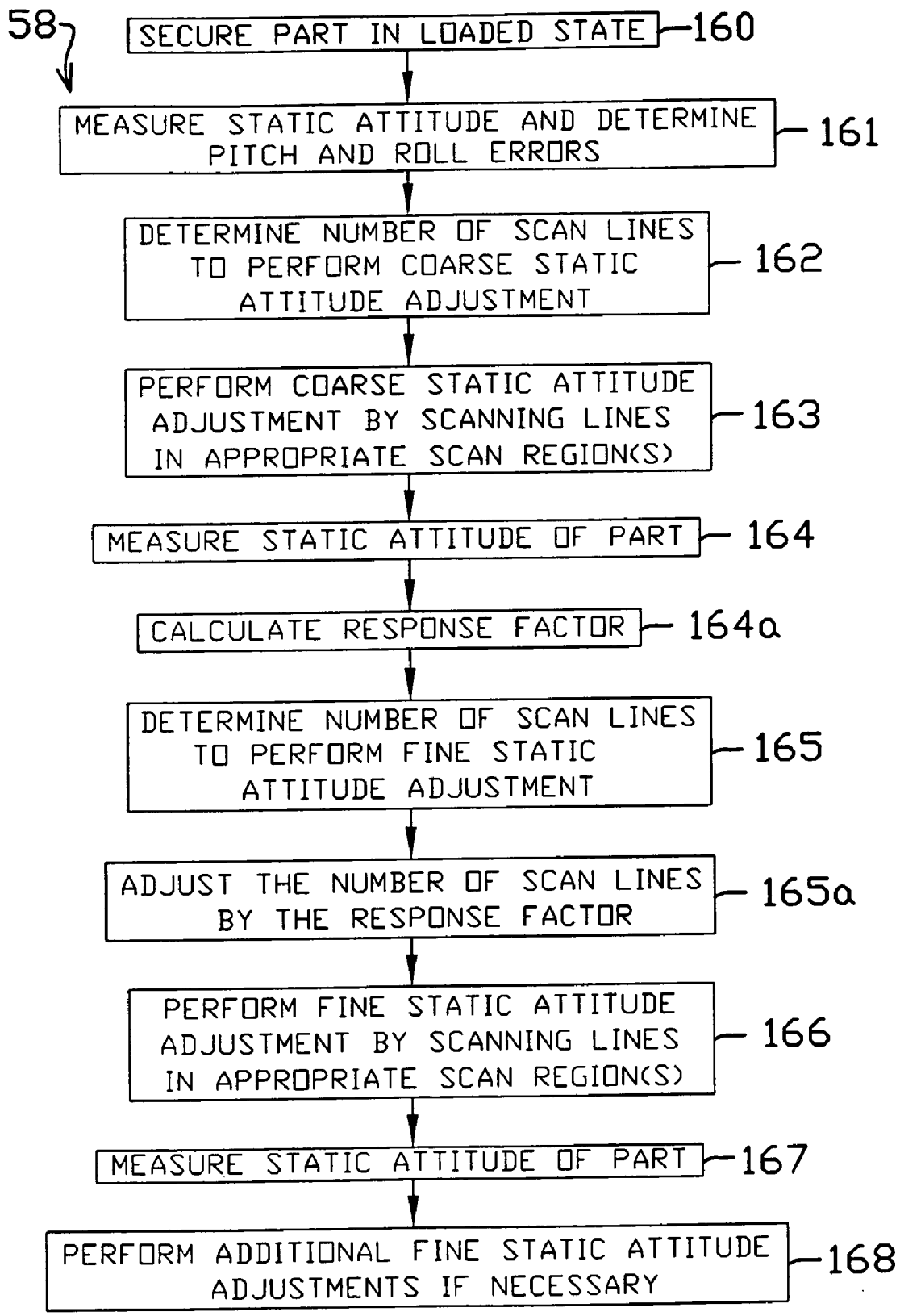

As shown in FIG. 6b, a response factor can be calculated and used to provide a more accurate fine static attitude adjust if desired. As shown at step 164a, after the coarse static attitude adjustment has been made and the resulting static attitude measured, a response factor can be computed by calculating the ratio of the estimated angular deflection to the measured angular deflection. The number of scan lines necessary to correct the remaining pitch and/or roll errors in static attitude can then be calculated at step 165, and the number of scan lines can be multiplied by the response factor at step 165a. If the part behaved as expected during the coarse static attitude adjustment, then the response factor will be 1.0, and no change will be made to the number of fine adjust scan lines. If less angular deflection than predicted was seen in the coarse static attitude adjust, then the response factor will be greater than 1.0 and the number fine adjust scan lines will be adjusted upward. If more response was seen during the coarse adjust, then the response factor will be less then 1.0, and the number of find adjust scan lines will accordingly be adjusted downward. The fine static attitude adjust is then performed at step 166 by scanning the scan regions with the adjusted number of fine adjust scan lines.

Using such an iterative, closed-loop process, pitch and roll corrections to within 0.01° of the desired static attitude have been achieved using coarse and fine adjustment response curves. A process that utilizes only two scan iterations also advantageously provides for a more efficient manufacturing process in that the cycle time for correcting static attitude can be reduced as compared to processes with additional scan iterations.

It is to be understood that, while the iterative process of FIGS. 6a and 6b has been described with reference to correcting only a portion of the pitch and roll errors with the coarse static attitude adjust step, the pitch and roll error correction goal of the coarse static attitude adjust can be up to 100%. In addition, the goal of the coarse static attitude adjust step can be set at a specific angular deflection, and the number of scan lines calculated based on this set figure if desired.

In the examples described above, the amount of scanning necessary to effect a desired angular deflection is described in terms of the number of scans needed to accomplish the course and fine static attitude adjustments for a given beam intensity, beam diameter, scan velocity, and scan line spacing. The relationship between the angular deflection achieved and the amount of scanning performed can also be determined as a function of a different laser operating parameters. For example, the number of scan lines could be held constant while the laser beam intensity is varied to determine the relationship between deflection and beam intensity. Both coarse and fine static attitude adjustments can be determined in this manner.

FIG. 23 shows an apparatus 70 useful for performing the measurement and scanning steps described herein, and specifically for performing the process shown in FIGS. 6a and 6b. Apparatus 70 is generally comprised of a clamp 72, a probe 74, an upper laser 76 having a laser fiber 90, a lower laser 78 having a lower laser fiber 92, an upper scan head 80 and a lower scan head 82. A head suspension is secured within clamp 72 and positioned beneath probe 74. As is known, clamp 72 includes an apparatus that places the head suspension 10 in a loaded state in order to simulate the fly height and orientation provided by the head suspension.

The probe 74 measures the positional orientation provided by the head suspension component. In a preferred embodiment, a WYKO probe, model number 872–104 and available from Veeco Metrology Group of Tuscon, Ariz., can be used to measure the positional orientation provided by the head suspension. The probe 74 is positioned above clamp 72 and the part held within clamp 72, and fires one or more lasers at the head suspension part supported in clamp 72 to measure the static provided by the part, as is known in the industry. Pitch and roll errors in static attitude can then be determined, such as with the use of a microprocessor (not shown). Upper laser 76 and lower laser 78 are each used to generate a laser beam of a desired intensity, and the intensity of lasers 76 and 78 can be controlled with the microprocessor, as is known. A continuous wave fiber laser such as is available from SDL, Inc., of San Jose, Calif., model number SDL-F620-4211-001, is preferred for lasers 76 and 78, and a focused spot size diameter of between 35 and 40 micrometers have been found to be useful in the method of the present invention. Upper laser 76 is used to direct a laser beam through fiber 90 and toward a top surface of the head suspension part supported in clamp 72 to scan one or more scan regions on the top surface of the part. Lower laser 78 is used to direct a laser beam through fiber 92 and toward a bottom surface of the part to scan one or more scan regions on the bottom surface of the part.

The movement of the laser beams across the part is accomplished with upper and lower scan heads 80 and 82. The upper laser beam is directed toward the upper scan head 80, while the lower laser beam is directed toward the lower scan head 82. Upper and lower scan heads 80 and 82, respectively, are used to deflect the laser beam from the upper and lower laser 76 and 78 toward turning mirrors 84 and 86, which redirect the laser energy toward the head suspension part held within clamp 72 to scan the desired pattern on the head suspension part. That is, the actual travel of the laser beam across a scan region of a head suspension is controlled through movement of the appropriate scan head. Accordingly, upper and lower scan heads 80 and 82 each include mirrors and objective lenses to deflect and focus the incoming laser beam toward the head suspension part, and each mirror is coupled to a servo motor (not shown) to move the mirror in a desired fashion to scan the head suspension part. The rate at which head suspension is scanned is also controlled by the motion of the mirrors. In this regard, the function of the upper and lower scan heads 80 and 82 are preferably controlled by the microprocessor attached to apparatus 70.

In the preferred embodiment shown in FIG. 3, the plurality of lines 34 scanned in a pair of scan regions, such as regions 32a and 32b, can be achieved with the use of a "jump pattern" between the pair of scan regions 32a and 32b. That is, a first distal line can be scanned in scan region 32a, the laser then "jumps" to the second scan region 32b and scans a first distal line in this region, the laser then jumps back to the first scan region 32a to scan a second line in this region that is proximal to the first scanned line. The laser is then redirected to the second region 32b to scan a second line distal of the first scanned line in region 32b, and so on until the desired number of lines has been scanned in each of the scan regions 32*a* and 32*b*. The proximal movement of the laser beam in the jump pattern controls the spacing between the individual lines in the plurality of lines, and this too is preferably controlled by the microprocessor of apparatus 70. In an embodiment such as that shown in FIG. 3 where the scan regions 32*a* and 32*b* are both defined in bottom surface 48 of flexure 40, the lower laser 78 and lower scan head 82 are used to scan the plurality of lines 34 in scan regions 32*a* and 32*b*. Where a scan region is identified in a top surface of a head suspension component, the upper laser 76 and upper scan head 80 are used to scan the desired pattern of lines in the upper region.

Scan heads are known in the industry, and in the apparatus shown, scan heads that are commercially available from Scanlab AG in Germany were used. A model HS7 1100 nm scan head from Scanlab has been found to be useful for upper and lower scan heads 80 and 82 of apparatus 70.

Once the probe 74 has determined the static attitude provided by the suspension, and the pitch and roll errors have been determined, the regions of the head suspension and the number of scan lines necessary to correct the pitch and/or roll static attitude errors can be determined, such as through the use of coarse and fine static attitude adjust response curves described above. In this regard, the microprocessor of apparatus 70 is again preferably used. That is, the same microprocessor can be used to operate the measuring probe 74, calculate the coarse and fine static attitude adjustments, the firing of the upper and lower lasers 76 and 78 at a desired intensity, and to control the motion of the upper and lower scan heads 80 and 82 to scan the regions of the head suspension a desired pattern at a desired speed.

Apparatus 70 performing the process 58 depicted in FIG. 6*a* advantageously corrects static attitude of a head suspension part to within acceptable levels, and may also advantageously reduce the cycle time per head suspension over conventional static attitude correction processes.

The method for adjusting the static attitude of head suspension by scanning the head suspension in the manner described above also advantageously provides for very precise pitch and roll corrections, with corrections to at least 0.01° of the desired static attitude possible. Pitch and roll corrections can be provided for independently of each other to provide great precision in these corrections. Alternatively, pitch and roll corrections can simultaneously be provided if desired.

The present invention also advantageously provides for a more efficient manufacturing process as compared to conventional processes, with part yield being increased due to the great precision with which corrections can be made, and with cycle time necessary to provide these corrections being reduced.

Moreover, the scanning of a plurality of lines to cause micro-warping of a head suspension component can be used to adjust other performance characteristics of a head suspension. As described above, the fly height at which a head slider operates is dependent upon the gram load provided by a spring region in a suspension load beam. The spring region is typically pre-formed or radiused to control the gram load provided. A plurality of lines can be scanned in the spring region of the load beam to change the gram load of the spring region. For example, to increase the gram load, the spring region can be scanned on a surface that increases the amount of curvature of the spring region. To decrease the gram load, the opposite surface can be scanned to reduce the amount of curvature in the spring region.

Although the present invention has been described with reference to preferred embodiments, workers skilled in the art will recognize that changes may be made in form and detail without departing from the spirit and scope of the invention.

The invention claimed is:

1. A method of measuring and adjusting the static attitude of a head suspension of the type for use in a dynamic storage device, the method comprising the steps of:
   providing a head suspension including:
   a flexure comprising first and second gimbal arms positioned at a distal end of the flexure and connected to a slider mounting tongue, the slider mounting tongue having a static attitude;
   a load beam supporting the flexure and having a mounting region at a proximal end, a rigid region distally spaced from the mounting region, and a spring region between the mounting region and the rigid region;
   determining the planar orientation of a surface that is indicative of the static attitude of the slider mounting tongue; and
   controllably permanently deforming a single gimbal arm of the flexure thereby adjusting the static attitude of the slider mounting tongue.

2. The method of claim 1, wherein the surface that is indicative of the static attitude of the slider mounting tongue is a surface of the slider mounting tongue of the head suspension being measured and adjusted.

3. The method of claim 1, wherein the step of determining the planar orientation of a surface that is indicative of the static attitude of the slider mounting tongue includes measuring the planar orientation of the surface with an optical measurement technique.

4. The method of claim 3, wherein the optical measurement technique utilizes an autocollimator.

5. The method of claim 4, wherein the autocollimator utilizes laser light.

6. The method of claim 1, further including the step of controllably permanently deforming an additional gimbal arm of the flexure after the step of controllably permanently deforming a single gimbal arm of the flexure.

7. The method of claim 1, further including the step of determining the planar orientation of a reference surface in addition to determining the static attitude of the slider mounting tongue before the step of controllably permanently deforming a single gimbal arm of the flexure.

8. The method of claim 7, wherein the steps of determining the static attitude of the slider mounting tongue and of determining the planar orientation of the reference surface are conducted on a head suspension in its free state without being subject to an external loading force.

9. The method of claim 1, wherein the step of determining the static attitude of the slider mounting tongue is conducted on a head suspension in a loaded state with a portion of the head suspension subject to an external loading force.

10. The method of claim 1, further including the step of operatively supporting the head suspension with a workpiece holder before the step of determining the planar orientation of the surface.

11. The method of claim 10, wherein the step of operatively supporting the head suspension includes supporting the load beam of the suspension with the workpiece holder.

12. The method of claim 11, wherein the step of operatively supporting the head suspension further includes securing the head suspension to the workpiece holder with a force of differential pressure.

13. A method of measuring and adjusting the static attitude of a head suspension of the type for use in a dynamic storage device, the method comprising the steps of:
  providing a head suspension including:
    a flexure comprising first and second gimbal arms positioned at a distal end of the flexure and connected to a slider mounting tongue, the slider mounting tongue having a static attitude;
    a load beam supporting the flexure and having a mounting region at a proximal end, a rigid region distally spaced from the mounting region, and
    a spring region between the mounting region and the rigid region;
  determining the planar orientation of a surface that is indicative of static attitude of the slider mounting tongue; and
  independently controllably permanently deforming the first gimbal arm and the second gimbal arm of the flexure thereby adjusting the static attitude of the slider mounting tongue.

14. The method of claim 13, wherein the gimbal arms are simultaneously but independently controllably permanently deformed for adjusting the static attitude of the slider mounting tongue.

15. The method of claim 13, wherein the gimbal arms are independently controllably permanently deformed one after the other for adjusting the static attitude of the slider mounting tongue.

16. The method of claim 13, wherein the surface that is indicative of the static attitude of the slider mounting tongue is a surface of the slider mounting tongue of the head suspension being measured and adjusted.

17. The method of claim 13, wherein the step of determining the planar orientation of a surface that is indicative of the static attitude of the slider mounting tongue includes measuring the planar orientation of the surface with an optical measurement technique.

* * * * *